United States Patent
Yu et al.

(10) Patent No.: US 12,192,879 B2
(45) Date of Patent: Jan. 7, 2025

(54) NETWORK ACCESS METHOD AND COMMUNICATION APPARATUS

(71) Applicant: Huawei Technologies Co., Ltd., Shenzhen (CN)

(72) Inventors: Youyang Yu, Shanghai (CN); Huan Li, Shenzhen (CN); Hualin Zhu, Shanghai (CN); Weisheng Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 329 days.

(21) Appl. No.: 17/662,883

(22) Filed: May 11, 2022

(65) Prior Publication Data

US 2022/0272607 A1 Aug. 25, 2022

Related U.S. Application Data

(63) Continuation of application No. PCT/CN2020/114497, filed on Sep. 10, 2020.

(30) Foreign Application Priority Data

Nov. 12, 2019 (CN) .......................... 201911102862.4

(51) Int. Cl.
*H04W 48/04* (2009.01)
*H04W 8/20* (2009.01)
*H04W 76/11* (2018.01)

(52) U.S. Cl.
CPC ............. *H04W 48/04* (2013.01); *H04W 8/20* (2013.01); *H04W 76/11* (2018.02)

(58) Field of Classification Search
CPC ..... H04W 48/04; H04W 48/08; H04W 48/16; H04W 8/10; H04W 8/186; H04W 8/20; H04W 76/11; H04W 88/18
See application file for complete search history.

(56) References Cited

U.S. PATENT DOCUMENTS 5,852,630 A * 12/1998 Langberg ............ H04L 27/2647
375/219
11,206,602 B2 * 12/2021 Huang-Fu ............ H04W 48/02
(Continued)

FOREIGN PATENT DOCUMENTS

| CN | 102111852 A | 6/2011 |
| CN | 102457938 A | 5/2012 |

(Continued)

OTHER PUBLICATIONS

3rd Generation Partnership Project; Technical Specification Group Services and System Aspects; Wireless and wireline convergence access support for the 5G System (5GS)(Release 16), 3GPP TS 23.316,76 Pages, Sep. 2019, V16.1.0.

(Continued)

*Primary Examiner* — Siu M Lee
(74) *Attorney, Agent, or Firm* — Slater Matsil, LLP

(57) ABSTRACT

A first network element first obtains an access request including access location information of a first terminal device; then, the first network element may obtain subscription information including subscription location information of the first terminal device; when the first network element determines that the access location information of the first terminal device does not belong to the subscription location information, the first network element may obtain allowed information for allowing the first terminal device to access a network at an access location corresponding to the access location information; and the first terminal device may further be allowed, based on the allowed information, to access the network at the access location corresponding to the access location information.

20 Claims, 15 Drawing Sheets

(56) References Cited

U.S. PATENT DOCUMENTS

| | | | |
|---|---|---|---|
| 2017/0105150 A1* | 4/2017 | Olsson | H04W 8/06 |
| 2017/0238180 A1* | 8/2017 | Li | H04W 84/045 |
| | | | 455/411 |
| 2018/0219974 A1 | 8/2018 | Kakaraparthi | |

FOREIGN PATENT DOCUMENTS

| | | |
|---|---|---|
| CN | 103052054 A | 4/2013 |
| CN | 106535112 A | 3/2017 |
| CN | 109699000 A | 4/2019 |
| EP | 3703399 A1 | 9/2020 |
| WO | 2011140780 A1 | 11/2011 |
| WO | 2012152046 A1 | 11/2012 |
| WO | 2017031726 A1 | 3/2017 |
| WO | 2019098623 A1 | 5/2019 |

OTHER PUBLICATIONS

3rd Generation Partnership Project; Technical Specification Group Services and System Aspects; Policy and Charging Control Framework for the 5G System (5GS); Stage 2(Release 16), 3GPP TS 23.503, 104 Pages, Sep. 2019, V16.2.0.

Cablelabs et al., "Mobility restrictions for wireline cable access", 3GPP TSG-SA WG2 Meeting #130, S2-1901848, Feb. 25 Mar. 1, 2019, 6 Pages, Santa Cruz—Tenerife, Spain.

* cited by examiner

NETWORK ACCESS METHOD AND COMMUNICATION APPARATUS

CROSS-REFERENCE TO RELATED APPLICATIONS

This application is a continuation of International Application No. PCT/CN2020/114497, filed on Sep. 10, 2020, which claims priority to Chinese Patent Application No. 201911102862.4, filed on Nov. 12, 2019. The disclosure of the aforementioned applications are hereby incorporated by reference in their entireties.

TECHNICAL FIELD

This application relates to the communication field, and in particular, to a network access method and a communication apparatus.

BACKGROUND

With rapid development of a fifth generation mobile communication system (5G), types of terminal devices are also increasing. In addition to a common mobile phone and a tablet computer, the terminal device may further include Internet of things (IoT) devices, home gateway devices for home broadband access, and the like.

Generally, each terminal device accesses a network based on subscription information corresponding to the terminal device. The subscription information is configured by an operator, and records information such as subscription location information that identifies a location at which the terminal device is allowed to access the network. In other words, each terminal device can access the network only at the location allowed by the subscription location information corresponding to the terminal device. Otherwise, the terminal device fails to access the network. For example, when the terminal device needs to access the network at a location, if a location area that is allowed to access the network in the subscription location information corresponding to the terminal device includes the location, it indicates that the terminal device can access the network at the location. If the location area that is allowed to access the network in the subscription location information corresponding to the terminal device does not include the location, it indicates that the terminal device cannot access the network at the location.

Therefore, when a location of the terminal device changes, and the location of the terminal device is not in the location area that is allowed to access the network in the subscription location information, the terminal device may fail to access the network. Therefore, how to improve accuracy of network access of the terminal device when the location of the terminal device changes is a current technical problem that needs to be resolved.

SUMMARY

Embodiments of this application provide a network access method and apparatus, to improve accuracy of network access by a terminal device.

According to a first aspect, this application provides a network access method, and the method includes: When accessing a network, a first network element first obtains an access request including access location information of a first terminal device, where the first network element may be an access management network element or a unified data management (UDM) network element. The access management network element may be an access and mobility management function (AMF) network element or a key controller node (MME) network element in a long term evolution (LTE) access network compliant with a universal mobile communication technology of the third generation partnership project (3GPP) protocol. For example, an AMF network element in FIG. 1b may obtain an access request input by a home gateway (5G-residential gateway, 5G-RG) device through a fixed network. Alternatively, an AMF network element in FIG. 1c may obtain an access request input by a 5G-RG by using a wireless network. Then, the first network element may obtain subscription information including subscription location information of the first terminal device. When the first network element determines that the access location information of the first terminal device does not belong to the subscription location information, the first network element may obtain allowed information for allowing the first terminal device to access the network at an access location corresponding to the access location information, and may further allow, based on the allowed information, the first terminal device to access the network at the access location corresponding to the access location information.

Compared with the conventional technology, in embodiments of this application, the first network element first determines whether the access location information of the first terminal device belongs to the subscription location information. When it is determined that the access location information does not belong to the subscription location information, the first terminal device is allowed, based on the obtained allowed information, to access the network at the access location corresponding to the access location information. This does not require a long time, thereby improving accuracy of accessing the network by a terminal device.

In a possible implementation, that the first network element obtains allowed information includes: The first network element obtains the allowed information from a second network element. In this way, the first terminal device may be allowed to access the network at the access location corresponding to the access location information, to improve the accuracy of accessing the network by the terminal device.

In a possible implementation, before the first network element obtains the allowed information from a second network element, the method further includes: The first network element sends at least one of the access location information of the first terminal device and first indication information to the second network element, where the first indication information is used to indicate the second network element to obtain the allowed information. In this way, at least one of a newly added field carried in the access location information and the first indication information may be used to indicate the second network element to obtain the allowed information. Therefore, it is easier to obtain the allowed information.

In a possible implementation, the method further includes: The first network element sends information about the terminal device to the second network element, where the information about the terminal device is used by the second network element to obtain the allowed information from the terminal device corresponding to the information about the terminal device. In this way, the second network element can quickly find, based on the information about the terminal device, the terminal device that can obtain the allowed information, thereby improving a rate and accuracy of obtaining the allowed information by the second network element, and further improving a rate and accuracy of obtaining the allowed information by the first network element.

In a possible implementation, the method further includes: The first network element sends an identifier of an access management network element corresponding to the terminal device to the second network element, where the identifier of the access management network element is used by the second network element to obtain the allowed information from the terminal device. In this way, the second network element quickly finds, based on the identifier of the access management network element, a terminal device corresponding to the access management network element, and can obtain the allowed information from the terminal device, thereby improving the rate and the accuracy of obtaining the allowed information by the second network element, and further improving the rate and the accuracy of obtaining the allowed information by the first network element.

In a possible implementation, the method further includes: The first network element sends second indication information to the first terminal device, where the second indication information is used to indicate the first terminal device to establish a session used to communicate with the second network element. The session is used by the first terminal device to send at least one of information about a terminal device, the access location information of the first terminal device, and third indication information to the second network element, where the third indication information is used to indicate the second network element to obtain the allowed information. In this way, the first terminal device and the second network element exchange session data by using the session, to implement a subsequent network access function.

In a possible implementation, the session is further used by the first terminal device to send the allowed information to the second network element.

In a possible implementation, the second indication information includes an identifier of the second network element and/or information indicating that the first terminal device is in an access restricted state.

In a possible implementation, the first network element is an access and mobility management function AMF network element or a unified data management UDM function network element. The method further includes: The first network element sends information indicating that the first terminal device is in the access restricted state to a session management network element and/or a policy control function PCF network element. In this way, a PDU session from the first terminal device to a network element A may be indicated, to further implement a subsequent network access function.

In a possible implementation, that the first network element obtains allowed information further includes: The first network element obtains a first parameter in the subscription information, where the first parameter indicates that when the access location information of the first terminal device does not belong to the subscription location information, the first terminal device is allowed to access the network at the access location corresponding to the access location information. In this way, the first terminal device can quickly and conveniently access the network based on content of the first parameter.

In a possible implementation, the first network element is an access management network element. After the first network element obtains allowed information, the method further includes: The access management network element sends a subscription information update request to a unified data management UDM function network element, where the subscription information update request includes the access location information of the first terminal device, and the subscription information update request is used to indicate the unified data management UDM function network element to update the subscription location information based on the access location information of the first terminal device.

In this way, the subscription location information can be automatically updated without setting by an operator or consuming a long time, thereby improving efficiency and convenience of accessing the network by the terminal device.

In a possible implementation, the first network element is a unified data management UDM function network element. After the first network element obtains allowed information, the method further includes: The unified data management UDM function network element updates the subscription location information based on the access location information of the first terminal device. In this way, the subscription location information can be updated without consuming a long time, thereby improving efficiency and convenience of accessing the network by the terminal device.

In a possible implementation, that the first network element obtains allowed information from the second network element includes: The first network element obtains the allowed information from the second network element within a first preset time period. In this way, time for obtaining the allowed information can be effectively monitored, to determine whether subsequent network access can be performed.

In a possible implementation, when the first network element does not obtain the allowed information within the first preset time period, the method further includes: The first network element sends timer information to the first terminal device, where the timer information is used to indicate the first terminal device to send the access request when a timer expires. In this way, a waiting time for the first terminal device to perform network access each time can be reduced, and network access efficiency can be improved.

In a possible implementation, that the first network element allows, based on the allowed information, the first terminal device to access the network at the access location corresponding to the access location information includes: The first network element sends an access success message to the first terminal device. In this way, the first terminal device may learn that the first terminal device can access the network at any time at the access location corresponding to the access location information, and an operator does not need to reconfigure new subscription information for the first terminal device to implement network access, thereby improving accuracy of network access of the first terminal device.

According to a second aspect, this application further provides a network access method, where the method includes: A first terminal device sends an access request to a first network element, and receives an access success message sent by the first network element based on the access request; and the first terminal device may access the network at an access location of the first terminal device based on the access success message, where access location information corresponding to the access location does not belong to subscription location information of the first terminal device.

Compared with the conventional technology, in embodiments of this application, after receiving the access success message sent by the first network element, the first terminal device may access the network at an access location that does not belong to the subscription location information of the first terminal device based on the access success message, without consuming a long time. This improves accuracy of accessing the network by the terminal device.

In a possible implementation, before the first terminal device receives the access success message sent by a first network element based on the access request, the method further includes: The first terminal device receives an access acknowledgment request from a second network element; the first terminal device obtains allowed information based on the access acknowledgment request, where the allowed information is information that allows the first terminal device to access the network at the access location corresponding to the access location information; and the first terminal device sends the allowed information to the second network element.

In a possible implementation, before the first terminal device receives the access success message sent by the first network element based on the access request, the method further includes: The first terminal device receives an identifier of the second network element and/or information indicating that the first terminal device is in an access restricted state from the first network element; and the first terminal device establishes a session with the second network element based on the identifier of the second network element and/or the information indicating that the first terminal device is in the access restricted state.

In this way, the first terminal device and the second network element exchange session data by using the session, to implement a subsequent network access function.

In a possible implementation, the access acknowledgment request includes one or more of the following: a web page, an SMS, and an email.

In a possible implementation, the method further includes: The first terminal device receives timer information from the first network element, where the timer information is used to indicate the first terminal device to send the access request after a timer expires; and the first terminal device sends the access request based on the timer information after the timer expires. In this way, a waiting time for the first terminal device to perform network access each time can be reduced, and network access efficiency can be improved.

In a possible implementation, the method further includes: The first terminal device sends indication information to the first network element, where the indication information is used to indicate the first network element to obtain allowed information from the second network element within a first preset time period, and the allowed information is information for allowing the first terminal device to access the network at the access location corresponding to the access location information. In this way, time for obtaining the allowed information can be effectively monitored, to determine whether subsequent network access can be performed.

According to a third aspect, this application further provides a network access method, where the method includes: A second network element obtains access location information of a first terminal device and information of a terminal device, where the access location information of the first terminal device does not belong to subscription location information of the first terminal device. Then, the second network element sends an access acknowledgment request to the terminal device, where the access acknowledgment request is used to obtain allowed information, and the allowed information is used to allow the first terminal device to access the network at an access location corresponding to the access location information. Then, the second network element receives the allowed information from the terminal device. Further, the second network element sends the allowed information to the first network element, where the allowed information is used by the first network element to allow the first terminal device to access the network at the access location corresponding to the access location information.

Compared with the conventional technology, in embodiments of this application, the second network element first obtains the allowed information through the terminal device, and then sends the allowed information to the first network element, so that the first network element allows the first terminal device to access the network at the access location corresponding to the access location information, without consuming a long time. This improves accuracy of accessing the network by the terminal device.

In a possible implementation, the information about the terminal device includes an identifier of a second terminal device. That a second network element obtains information of a terminal device includes: The second network element obtains an identifier of the first terminal device; and the second network element obtains the identifier of the second terminal device based on the identifier of the first terminal device. That the second network element sends an access acknowledgment request to the terminal device includes: The second network element sends the access acknowledgment request to the second terminal device based on the identifier of the second terminal device. In this way, even when the first terminal device cannot receive the access acknowledgment request, the second terminal device may receive the acknowledgment request, thereby effectively improving accuracy of sending the access acknowledgment request.

In a possible implementation, that the second network element sends the access acknowledgment request to the second terminal device based on the identifier of the second terminal device includes: The second network element obtains, based on the identifier of the second terminal device, an identifier of an access management network element serving the second terminal device; and the second network element sends the access acknowledgment request to the access management network element based on the identifier of the access management network element, where the access acknowledgment request includes the identifier of the second terminal device, and the identifier of the second terminal device is used to obtain the allowed information from the second terminal device. In this way, when the first terminal device cannot provide the allowed information, the second terminal device may be found by using the identifier of the access management network element, and then the allowed information may be obtained through the second terminal device, thereby effectively improving accuracy of sending the access acknowledgment request.

According to a fourth aspect, this application further provides a network access method, where the method includes: A unified data management UDM function network element first receives a subscription information obtaining request from an access management network element, where the subscription information obtaining request includes a first identifier of a first terminal device. Then, the unified data management UDM function network element obtains subscription information of the first terminal device based on the first identifier of the first terminal device, where the subscription information includes subscription location information of the first terminal device and a first parameter, and the first parameter indicates that when access location information of the first terminal device does not belong to the subscription location information, the first terminal device is allowed to access the network at an access location corresponding to the access location information. Then, the unified data management UDM function network element sends the subscription information of the first terminal device to the access management network element.

Compared with the conventional technology, in embodiments of this application, the UDM network element first determines whether the subscription information of the first terminal device includes the first parameter. When determining that the subscription information includes the first parameter, the UDM network element quickly and conveniently implements network access of the first terminal device based on content of the first parameter. A long time is not required, thereby improving accuracy of accessing the network by a terminal device.

In a possible implementation, the subscription information further includes information about the terminal device.

In a possible implementation, the information about the terminal device includes an identifier of a second terminal device.

In a possible implementation, the method further includes: The unified data management UDM function network element receives a second identifier of the first terminal device from a second network element; the unified data management UDM function network element obtains the identifier of the second terminal device based on the second identifier of the first terminal device; and the unified data management UDM function network element sends the identifier of the second terminal device to a network capability exposure function NEF network element, where the identifier of the second terminal device is used to obtain allowed information from the second terminal device, and the allowed information is information for allowing the first terminal device to access the network at the access location corresponding to the access location information.

In this way, when the first terminal device cannot provide the allowed information, the second terminal device may be found through the NEF network element, and the allowed information may be obtained from the second terminal device by using an SMS. This can effectively improve accuracy of obtaining the allowed information, and further improve accuracy of accessing the network by the first terminal device.

In a possible implementation, the subscription information further includes an identifier of an access management network element serving the terminal device. In this way, the UDM network element may further send an obtaining request for allowed information to the access management network element corresponding to the identifier of the access management network element, to obtain the allowed information from the terminal device corresponding to the access management network element by using the access management network element, thereby improving the accuracy of obtaining the allowed information, and further improving the accuracy of accessing the network by the first terminal device.

According to a fifth aspect, this application further provides a communication apparatus, used in a first network element, and the apparatus includes: an obtaining unit, configured to obtain an access request, where the access request includes access location information of a first terminal device; obtain subscription information of the first terminal device, where the subscription information includes subscription location information; and obtain allowed information when it is determined that the access location information of the first terminal device does not belong to the subscription location information, where the allowed information is information that allows the first terminal device to access a network at an access location corresponding to the access location information; and an allowing unit, configured to allow, based on the allowed information, the first terminal device to access the network at the access location corresponding to the access location information.

In a possible implementation, that the obtaining unit is configured to obtain allowed information includes: The obtaining unit is configured to obtain the allowed information from a second network element.

In a possible implementation, the apparatus further includes: a sending unit, configured to send at least one of the access location information of the first terminal device and first indication information to the second network element, where the first indication information is used to indicate the second network element to obtain the allowed information.

In a possible implementation, the sending unit is further configured to send information of a terminal device to the second network element, where the information about the terminal device is used by the second network element to obtain the allowed information from the terminal device corresponding to the information about the terminal device.

In a possible implementation, the sending unit is further configured to send an identifier of an access management network element corresponding to the terminal device to the second network element, where the identifier of the access management network element is used by the second network element to obtain the allowed information from the terminal device.

In a possible implementation, the sending unit is further configured to send second indication information to the first terminal device, where the second indication information is used to indicate the first terminal device to establish a session used to communicate with the second network element. The session is used by the first terminal device to send at least one of the information about the terminal device, the access location information of the first terminal device, and third indication information to the second network element, where the third indication information is used to indicate the second network element to obtain the allowed information.

In a possible implementation, the session is further used by the first terminal device to send the allowed information to the second network element.

In a possible implementation, the second indication information includes an identifier of the second network element and/or information indicating that the first terminal device is in an access restricted state.

In a possible implementation, the communication apparatus is an access and mobility management function AMF network element or a unified data management UDM function network element, and the sending unit is further configured to send the information indicating that the first terminal device is in the access restricted state to a session management network element and/or a policy control function PCF network element.

In a possible implementation, that the obtaining unit is configured to obtain allowed information includes: The obtaining unit is configured to obtain a first parameter in the subscription information, where the first parameter indicates that when the access location information of the first terminal device does not belong to the subscription location information, the first terminal device is allowed to access the network at the access location corresponding to the access location information.

In a possible implementation, the communication apparatus is the access management network element. The sending unit is configured to send a subscription information update request to a unified data management UDM function network element, where the subscription information update request includes the access location information of the first terminal device, and the subscription information update request is used to indicate the unified data management UDM function network element to update the subscription location information based on the access location information of the first terminal device.

In a possible implementation, the communication apparatus is the unified data management UDM function network element. The apparatus further includes an updating unit, configured to update the subscription location information based on the access location information of the first terminal device.

In a possible implementation, that the obtaining allowed information includes: obtaining the allowed information from the second network element in a first preset time period.

In a possible implementation, when the first network element does not obtain the allowed information within the first preset time period, the sending unit is configured to send timer information to the first terminal device, where the timer information is used to indicate the first terminal device to send the access request after a timer expires.

In a possible implementation, that the allowing, based on the allowed information, the first terminal device to access the network at the access location corresponding to the access location information includes: sending an access success message to the first terminal device.

According to a sixth aspect, this application further provides a communication apparatus, used in a first terminal device, and the apparatus includes: a sending unit, configured to send an access request to a first network element; a receiving unit, configured to receive an access success message sent by the first network element based on the access request; and a processing unit, configured to access a network at an access location of the first terminal device based on the access success message, where access location information corresponding to the access location does not belong to subscription location information of the first terminal device.

In a possible implementation, the receiving unit is further configured to receive an access acknowledgment request from a second network element. The processing unit is further configured to obtain allowed information based on the access acknowledgment request, where the allowed information is information that allows the first terminal device to access the network at an access location corresponding to the access location information. The sending unit is further configured to send the allowed information to the second network element.

In a possible implementation, the receiving unit is further configured to receive an identifier of the second network element and/or information indicating that the first terminal device is in an access restricted state from the first network element. The processing unit is further configured to establish a session with the second network element based on the identifier of the second network element and/or the information indicating that the first terminal device is in the access restricted state.

In a possible implementation, the access acknowledgment request includes one or more of the following: a web page, an SMS, and an email.

In a possible implementation, the receiving unit is further configured to receive timer information from the first network element, where the timer information is used to indicate the first terminal device to send the access request after a timer expires.

The sending unit is further configured to send the access request based on the timer information after the timer expires.

According to a seventh aspect, this application further provides a communication apparatus, used in a second network element, and the apparatus includes: an obtaining unit, configured to obtain access location information of a first terminal device and information of a terminal device, where the access location information of the first terminal device does not belong to subscription location information of the first terminal device; a sending unit, configured to send an access acknowledgment request to the terminal device, where the access acknowledgment request is used to obtain allowed information, and the allowed information is used to allow the first terminal device to access a network at an access location corresponding to the access location information; and a receiving unit, configured to receive the allowed information from the terminal device. The sending unit is further configured to send the allowed information to the first network element, where the allowed information is used by the first network element to allow the first terminal device to access the network at the access location corresponding to the access location information.

In a possible implementation, the information about the terminal device includes an identifier of a second terminal device. An obtaining unit is configured to obtain an identifier of the first terminal device, and obtain the identifier of the second terminal device based on the identifier of the first terminal device. The sending unit is configured to send the access acknowledgment request to the second terminal device based on the identifier of the second terminal device.

In a possible implementation, the obtaining unit is configured to obtain, based on the identifier of the second terminal device, an identifier of an access management network element serving the second terminal device. The sending unit is configured to send the access acknowledgment request to the access management network element based on the identifier of the access management network element, where the access acknowledgment request includes the identifier of the second terminal device, and the identifier of the second terminal device is used to obtain the allowed information from the second terminal device.

According to an eighth aspect, this application further provides a communication apparatus, used in a unified data management UDM function network element, and the apparatus includes: a receiving unit, configured to receive a subscription information obtaining request from an access management network element, where the subscription information obtaining request includes a first identifier of a first terminal device; an obtaining unit, configured to obtain subscription information of the first terminal device based on the first identifier of the first terminal device, where the subscription information includes subscription location information of the first terminal device and a first parameter, and the first parameter indicates that when access location information of the first terminal device does not belong to the subscription location information, the first terminal device is allowed to access a network at an access location corresponding to the access location information; and a sending unit, configured to send the subscription information of the first terminal device to the access management network element.

In a possible implementation, the subscription information further includes information of a terminal device.

In a possible implementation, the information about the terminal device includes an identifier of a second terminal device.

In a possible implementation, the receiving unit is further configured to receive a second identifier of the first terminal device from a second network element.

The obtaining unit is further configured to obtain the identifier of the second terminal device based on the second identifier of the first terminal device.

The sending unit is further configured to send the identifier of the second terminal device to a network capability exposure function NEF network element, where the identifier of the second terminal device is used to obtain allowed information from the second terminal device, and the allowed information is information that allows the first terminal device to access the network at the access location corresponding to the access location information.

In a possible implementation, the subscription information further includes an identifier of an access management network element serving the terminal device.

According to a ninth aspect, this application further provides a communication apparatus. The communication apparatus includes a memory and a processor.

The memory is configured to store instructions. The processor is configured to execute the instructions in the memory, to perform the method in any one of the first aspect to the fourth aspect and the possible implementations of the first aspect.

According to a tenth aspect, this application further provides a computer-readable storage medium, including instructions. When the instructions are run on a computer, the computer is enabled to perform the method in any one of the first aspect to the fourth aspect and the possible implementations of the first aspect.

According to an eleventh aspect, embodiments of this application provide a chip or a chip system. The chip or the chip system includes at least one processor and a communication interface. The communication interface and the at least one processor are interconnected through a line. The at least one processor is configured to run a computer program or instructions, to perform the method according to any one of the first aspect and the possible implementations of the first aspect, or perform the method according to any one of the second aspect and the possible implementations of the second aspect, or perform the method according to any one of the third aspect and the possible implementations of the third aspect, or perform the method according to any one of the fourth aspect and the possible implementations of the fourth aspect.

The communication interface in the chip may be an input/output interface, a pin, a circuit, or the like.

In a possible implementation, the chip or the chip system described above in this application further includes at least one memory, and the at least one memory stores instructions. The memory may be a storage unit inside the chip, for example, a register or a cache, or may be a storage unit (for example, a read-only memory or a random access memory) of the chip.

According to a twelfth aspect, embodiments of this application provide a communication system, including at least two communication apparatuses in the fifth aspect to the eighth aspect.

DETAILED DESCRIPTION OF ILLUSTRATIVE EMBODIMENTS

The following describes embodiments of this application with reference to the accompanying drawings.

Figure 1A:
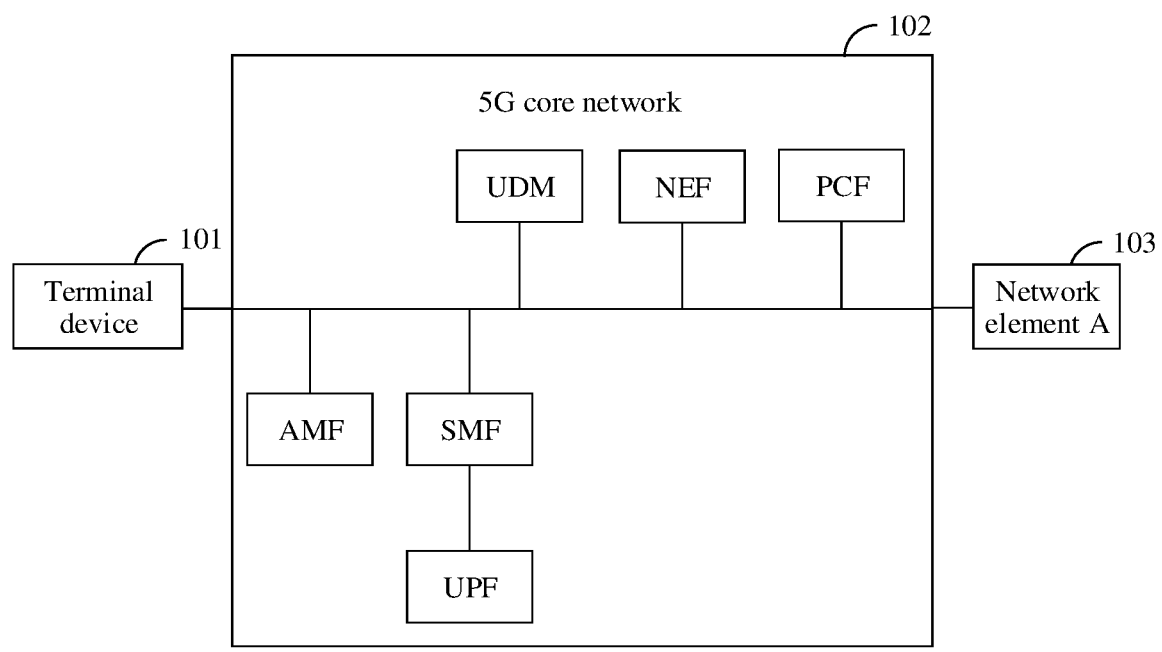
FIG. 1a is an example diagram of a system architecture to which an embodiment of this application is applied.

FIG. 1a is an example diagram of a system architecture to which an embodiment of this application is applied. As shown in FIG. 1a, a terminal device 101, a 5G core network 102, and a network element A 103 are included in the scenario. The terminal device 101 is connected to the 5G core network 102, and the 5G core network 102 is connected to the network element A 103. The "connection" may be a direct connection, or may be an indirect connection.

The terminal device 101 may also be referred to as user equipment (UE), a mobile station (MS), a mobile terminal (MT), a terminal, or the like, and is a device that provides voice and/or data connectivity for a user, or a chip disposed in the device, for example, a handheld device or a vehicle-mounted device having a wireless connection function. Currently, some examples of the terminal device are a mobile phone, a tablet, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, a wireless terminal in a smart home, a 5G-residential gateway (5G-RG) that supports 5G access, or the like. The terminal device provided in embodiments of this application may be a low-complexity terminal device and/or a terminal device in a coverage enhancement mode A.

For the 5G core network 102, some function network elements in the 5G core network are provided. The function network elements include an access and mobility management function AMF network element, a session management function (SMF) network element, a unified data management (UDM) network element, a user plane function (UPF) network element, a network exposure function (NEF) network element, and a policy control function (PCF) network element. Certainly, the core network may further include another function network element. For details, refer to related descriptions in the 5G standard.

The AMF network element is a control plane network element provided by an operator network, and is mainly responsible for access control and mobility management for accessing the operator network by a terminal device, for example, including functions such as mobility status management, temporary user identity assignment, and user authentication and authorization.

The SMF network element is a control plane network element provided by the operator network, and is responsible for managing a protocol data unit (PDU) session of the terminal device. The PDU session is a channel used for transmission of a PDU, and transmission of the PDU needs to be performed between the terminal device 101 and a data network (DN) through the PDU session. The SMF network element is responsible for establishment, maintenance, deletion, and the like of the PDU session. The SMF network element includes session-related functions such as session management (for example, session establishment, modification, and release, including maintenance of a tunnel between the UPF network element and a radio access network (RAN)), selection and control of the UPF network element, service and session continuity (SSC) mode selection, and roaming.

The UPF network element is a gateway provided by an operator, and is a gateway for communication between the operator network and the DN. The UPF network element includes user plane-related functions such as packet routing and transmission, packet detection, service usage reporting, quality of service (Quality of Service, QoS) processing, lawful interception, uplink packet detection, and downlink packet storage.

The PCF network element is a control plane function provided by the operator, and is configured to provide a policy of the PDU session for the SMF network element. The policy may include an accounting-related policy, a QoS-related policy, an authorization-related policy, and the like.

The UDM network element is responsible for managing subscription information of the terminal device 101, and is responsible for notifying a corresponding network element when the subscription information is modified.

The NEF network element mainly supports a network capability exposure function, and externally exposes a network capability and a service. A 3GPP network function (NF) releases a function and an event to another NF through the NEF. The capability and the event opened by the NF can be securely opened to a third-party application. The NEF stores/retrieve s structured data through a standardized interface (Nudr) of a unified data repository (UDR), and translates exchange information of an AF with exchange information of an internal network function. For example, the NEF translates an AF service identifier AF-Service-Identifier with internal 5G core information.

The network element A 103 may be an application function (AF) network element, for example, an application function network element or an application function server in a network corresponding to a data network name (DNN), and is configured to provide an application layer service for the terminal device 101. When the AF provides the service for the terminal device 101, there are requirements on a QoS policy and a charging policy, and the network needs to be notified of the requirements. In addition, the AF also needs application-related information fed back by a core network. Alternatively, the network element A 103 may be a newly added independent 5G function network element, and directly interacts with another network element in the 5G core network, to provide a corresponding service for the terminal device 101.

Figure 1B:
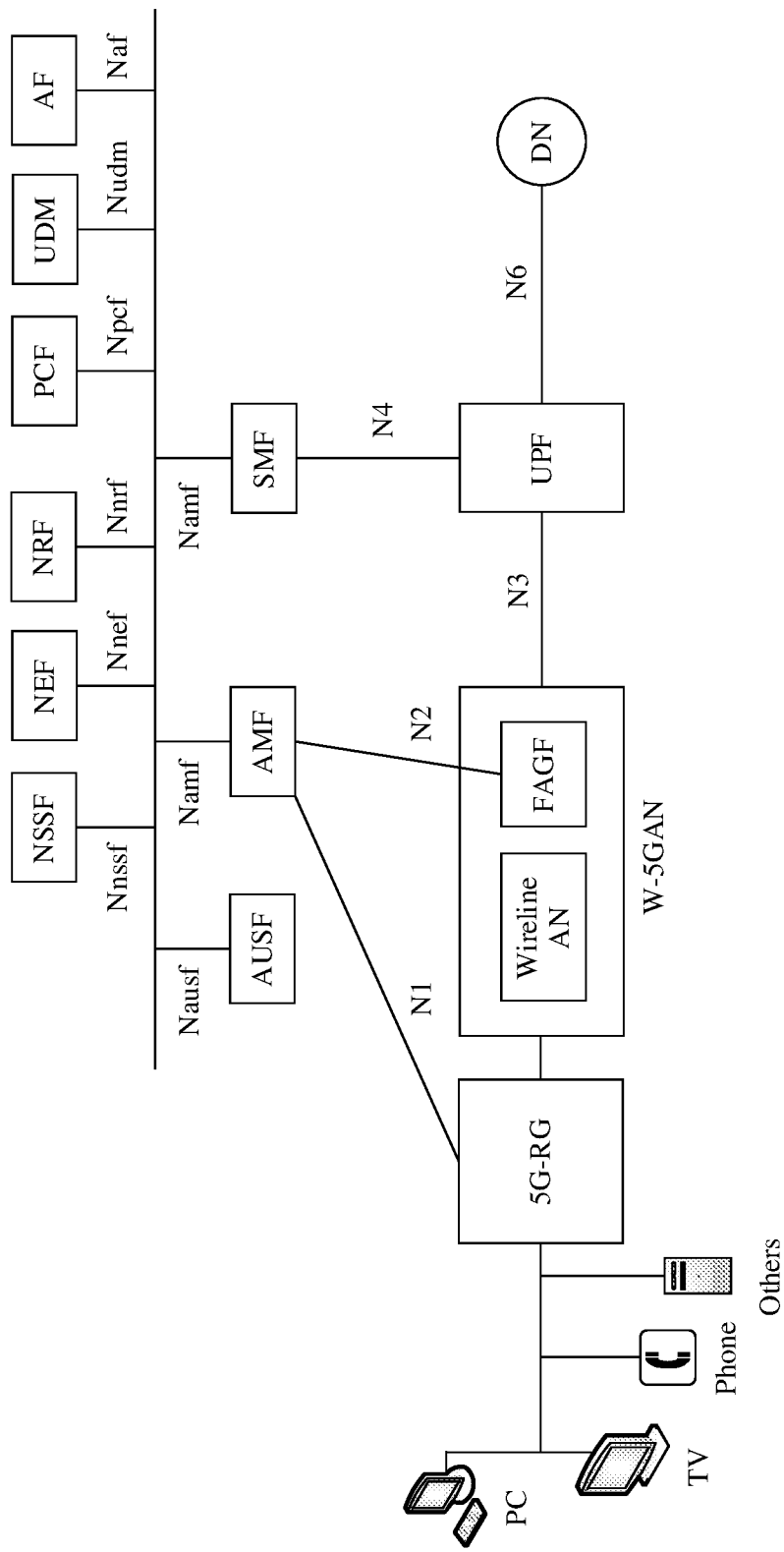
FIG. 1b is an example diagram of another system architecture to which an embodiment of this application is applied.

Alternatively, in another scenario, as shown in FIG. 1*b*, the terminal device 101 is a 5G-RG. FIG. 1*b* is a schematic diagram of a scenario in which the 5G-RG accesses the 5G core network 102 through a fixed network. The fixed network may include a wired active network (wireline active network), an access gateway function (FAGF), and the like. The 5G core network 102 is shown in the upper part of FIG. 1*b*. The 5G core network not only includes the AMF network element, the SMF network element, the NEF network element, the PCF network element, and the UDM network element described in the foregoing scenario, but also includes an authentication server function (AUSF) network element, a network slice selection function (NSSF) network element, a network element repository function (NRF) network element, or the like. For specific descriptions of functions of the network elements, refer to related descriptions in the 5G standard.

Figure 1C:
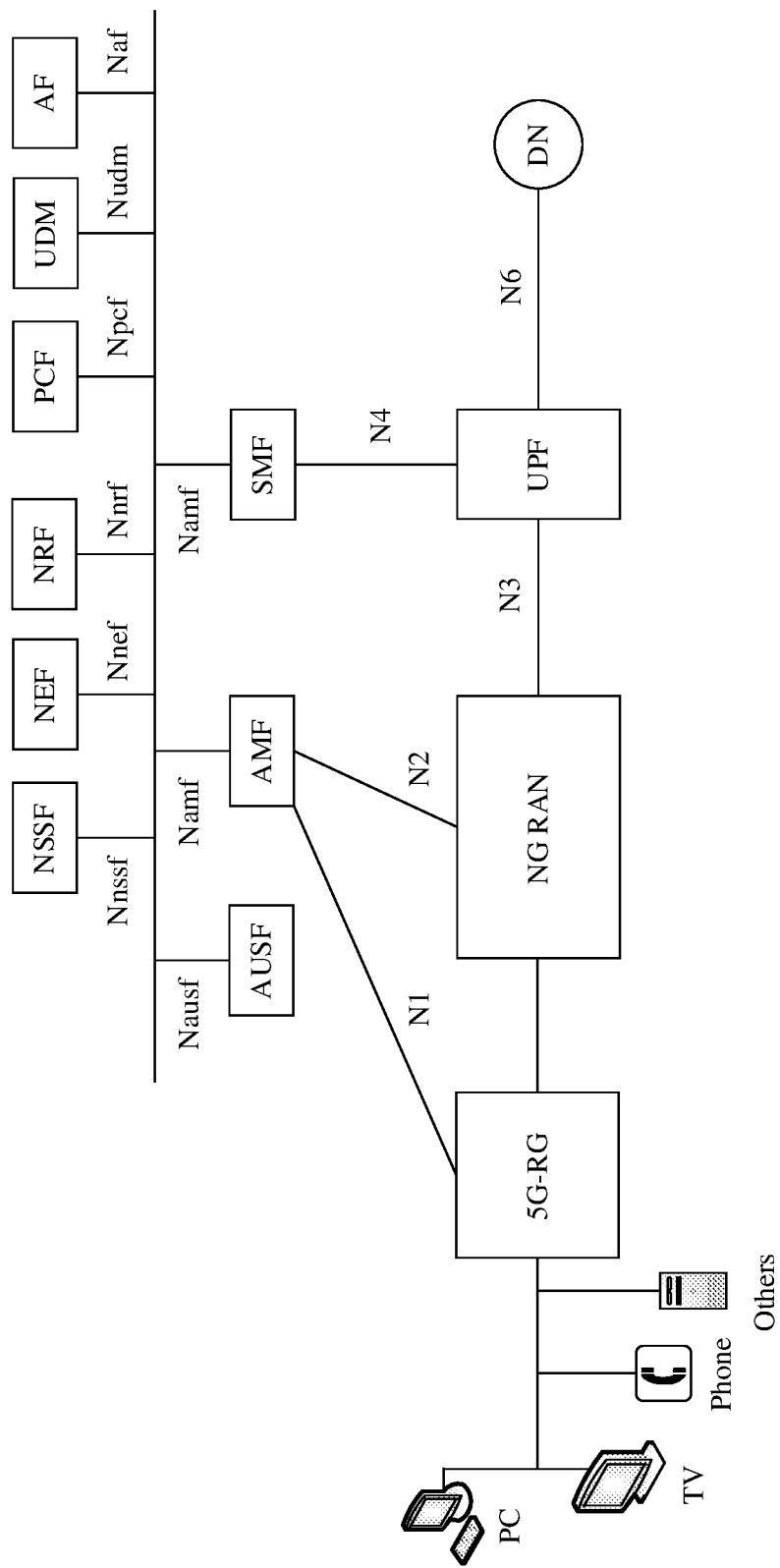
FIG. 1c is an example diagram of still another system architecture to which an embodiment of this application is applied.

Alternatively, in another scenario, as shown in FIG. 1*c*, the terminal device 101 is still a 5G-RG. FIG. 1*c* is a schematic diagram of a scenario in which the 5G-RG accesses the 5G core network 102 through a 3GPP wireless network (NG RAN). The 3GPP wireless network may include a next generation 3GPP radio access network, a 5G 3GPP access network, or the like. For specific descriptions of functions, refer to related descriptions in the 5G standard.

In this application, a first network element may be the AMF network element or the UDM network element in the 5G core network 102 shown in FIG. 1*a*, and a first terminal device may be the terminal device 101 shown in FIG. 1. In this way, In a process of implementing network interaction between the terminal device 101 and the network element A 103, the AMF network element or the UDM network element may first obtain an access request including access location information of the terminal device 101 and subscription information including subscription location information of the first terminal device, and determine whether the access location information belongs to the subscription location information. When it is determined that the access location information does not belong to the subscription location information, the AMF network element or the UDM network element may allow, based on the obtained allowed information, the terminal device 101 to access the network at an access location corresponding to the access location information. Further, network interaction with the network element A 103 is implemented, so that if an operator does not need to update the subscription information, the AMF network element or the UDM network element determines the access location information of the terminal device 101 based on the obtained allowed information. In this way, the access location information becomes new subscription location information, thereby implementing automatic update of the subscription information without consuming a long update time, and improving accuracy of accessing the network by the terminal device.

It should be noted that the foregoing several application scenarios are shown only for ease of understanding of this application, and an implementation of this application is not limited in this aspect. On the contrary, the implementations of this application may be applied to any applicable scenario, for example, to a future evolved communication system.

Based on the foregoing application scenario, an embodiment of this application provides a network access method. The following describes the method.

S201: A first network element obtains an access request, where the access request includes access location information of a first terminal device.

In this embodiment, any terminal device that accesses a network by using this embodiment is defined as the first terminal device. It may be understood that the first terminal device may be any terminal device mentioned in the foregoing terminal device 101. The first terminal device accessing the network refers to a process in which the first terminal device obtains various services by accessing the 5G core network 102 shown in FIG. 1*a*. For example, the first terminal device may interact data with the network element A 103 through the 5G core network 102 shown in FIG. 1, to update subscription information such as network registration and online registration, so that the first terminal device can access the network at a current access location.

When accessing a network, the first network element first needs to obtain, through an access network (such as a 5G base station and a non-3GPP access gateway), an access request including the access location information of the first terminal device. The first network element may be the AMF network element or the UDM network element in the 5G core network 102 described above, or may be an MME network element. The access location information of the first terminal device may include cellular location information, for example, a cell ID, or wireless local area network (WLAN) access point information, for example, a service set identifier (SSID), or fixed access point location information, for example, a line identifier (line ID).

It should be noted that, in embodiments of this application, neither a network type of the access network nor a type of the access location information of the first terminal device is limited, and select a type based on an actual situation. In embodiments of this application, a fixed access network and the line ID that is used as the access location information of the first terminal device are used as an example for description.

S202: The first network element obtains subscription information of the first terminal device, where the subscription information includes subscription location information.

In this embodiment, to improve accuracy of accessing the network by the first terminal device, the first network element further needs to obtain the subscription information of the first terminal device based on an identifier of the first terminal device, where the subscription information includes subscription location information. The subscription location information refers to recorded information corresponding to a location area in which the first terminal device can access the network. The identifier of the first terminal device refers to a user identifier representing identity information of the first terminal device, and may include a subscription concealed identifier (SUCI), a subscription permanent identifier (SUPI), a mobile station integrated services digital network number (MSISDN) of the first terminal, a temporary identifier, and the like.

S203: When the first network element determines that the access location information of the first terminal device does not belong to the subscription location information, the first network element obtains allowed information, where the allowed information is information for allowing the first terminal device to access the network at an access location corresponding to the access location information.

In this embodiment, after obtaining the access request including the access location information of the first terminal device and the subscription information including the subscription location information of the first terminal device, the first network element further needs to determine whether the access location information of the first terminal device belongs to the subscription location information, that is, needs to determine whether the access location information belongs to a location area in which the first terminal device accesses the network and that is recorded in the subscription information corresponding to the first terminal device.

When the first network element determines that the access location information of the first terminal device does not belong to the subscription location information, that is, the access location information does not belong to the location area in which the first terminal device accesses the network and that is recorded in the subscription information corresponding to the first terminal device, the first network element may obtain the allowed information. The allowed information is information that allows the first terminal device to access the network at the access location corresponding to the access location information. The allowed information may be a first parameter in the subscription information, and the first parameter indicates that the first terminal device can access the network at a non-subscribed access location. The first parameter may be indication information, an identifier of the first terminal device, and/or a type of the first terminal device; and/or the allowed information may alternatively be information that is used by the first terminal device to access the network at an access location corresponding to the access location information and that is confirmed by the first terminal device or a second terminal device. The second terminal device is another terminal device other than the first terminal device. An identifier of the second terminal device may have a specific mapping relationship with the identifier of the first terminal device. The mapping relationship reflects a one-to-one correspondence between the identifier of the first terminal device and the identifier of the second terminal device. According to the mapping relationship, an identifier of another corresponding terminal device may be determined based on an identifier of any one of the terminal devices. In this way, when the first terminal device cannot confirm that the first terminal device can access the network at the access location corresponding to the access location information, the second terminal device may be used for confirmation. Alternatively, the second terminal device may be a terminal device through which a user logs in to an account of social software (such as a mailbox or WeChat).

It should be noted that, when the first network element is an access management network element (an AMF network element or an MME network element) or a UDM network element, four different implementations for triggering network access may be correspondingly generated based on different ways of obtaining the allowed information by the first network element. In each implementation, it may be determined whether the access location information of the first terminal device belongs to the subscription location information and how the first network element subsequently obtains the allowed information, to allow the first terminal device to access the network at the access location corresponding to the access location information. For a specific implementation process, refer to detailed descriptions in subsequent embodiments.

S204: The first network element allows, based on the allowed information, the first terminal device to access the network at the access location corresponding to the access location information.

In this embodiment, after obtaining the allowed information for allowing the first terminal device to access the network at the access location corresponding to the access location information, the first network element may allow, based on the allowed information, the first terminal device to access the network at the access location corresponding to the access location information. In other words, the subscription information corresponding to the first terminal device is automatically updated.

In addition, in an optional implementation, the first network element may further send an access success message to the first terminal device. Therefore, the first terminal device can access the network at anytime at the access location corresponding to the access location information based on the message, and an operator does not need to reconfigure new subscription information for the first terminal device to implement network access, thereby improving accuracy of network access of the first terminal device.

In conclusion, according to the network access method provided in this embodiment, when accessing a network, the first network element first obtains the access request including the access location information of the first terminal device, where the first network element may be the access management network element or the UDM network element. The access management network element may be the AMF network element or the MME network element. Then, the first network element may obtain subscription information including subscription location information of the first terminal device. When the first network element determines that the access location information of the first terminal device does not belong to the subscription location information, the first network element may obtain allowed information for allowing the first terminal device to access the network at an access location corresponding to the access location information, and may further allow, based on the allowed information, the first terminal device to access the network at the access location corresponding to the access location information. It can be learned that, in a current method, the operator needs to reconfigure the new subscription information for the terminal device to implement network access. In embodiments of this application, the first network element first determines whether the access location information of the first terminal device belongs to the subscription location information. When it is determined that the access location information does not belong to the subscription location information, the first terminal device is allowed, based on the obtained allowed information, to access the network at the access location corresponding to the access location information, without consuming a long time, thereby improving accuracy of accessing the network by the terminal device.

Next, specific implementation processes of the four different implementations generated when the first network element is the access management network element (the AMF network element or the MME network element) or the UDM network element are described in this embodiment.

Figure 3:
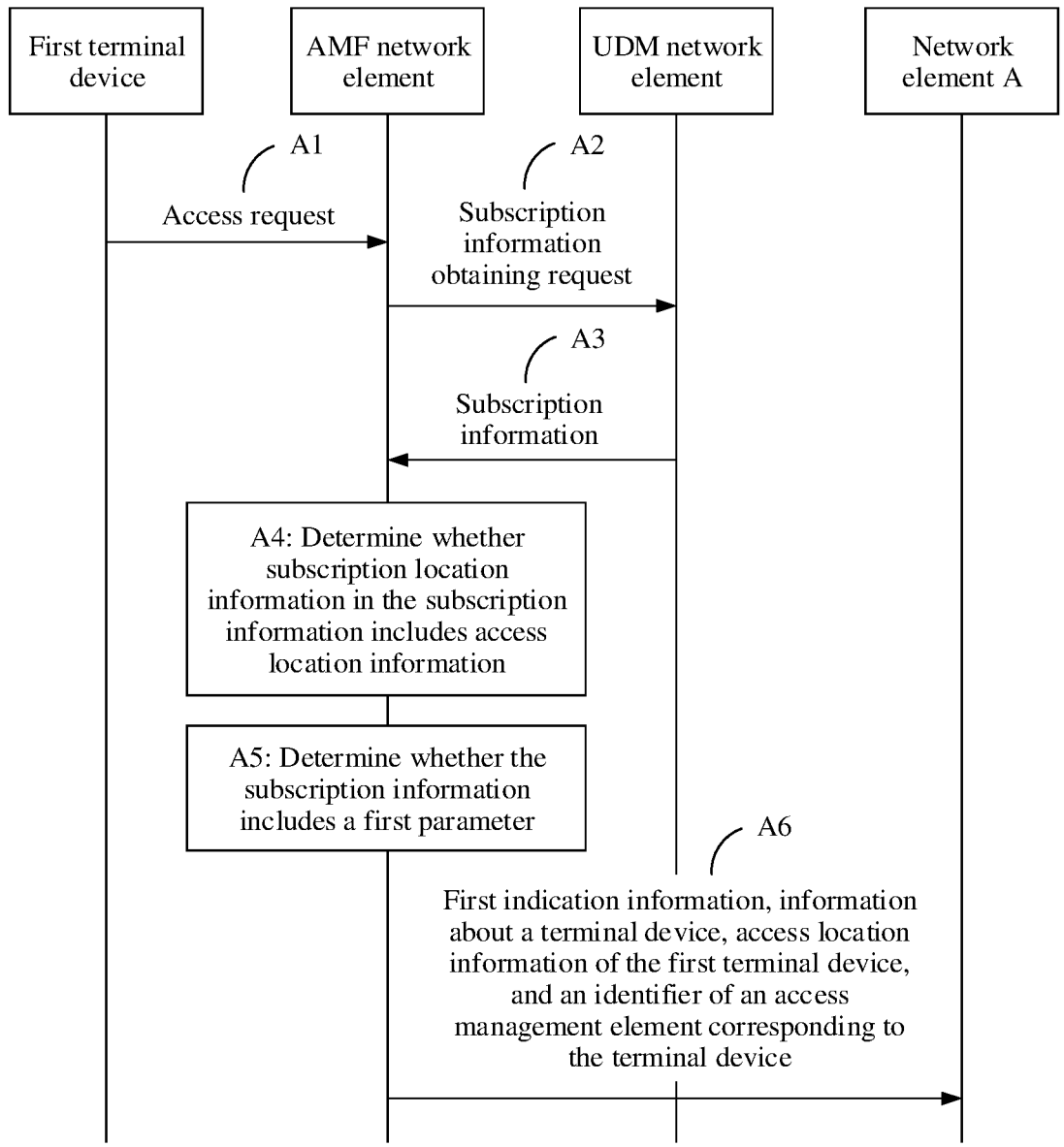
FIG. 3 is a flowchart of a network access method according to an embodiment of this application.

(1) In a first implementation of this embodiment, the first network element is, for example, the AMF network element, and the second network element is a network element A (for example, an AF network element, that is, an application function network element interacting with a terminal in a DNN network, an application server in a DNN network, or a logical function network element A in a 5G core network). As shown in FIG. 3, a specific implementation process may include the following steps A1 to A6.

Step A1: The AMF network element receives the access request sent by the first terminal device, where the access request includes the identifier of the first terminal device.

The identifier of the first terminal device is a user identifier representing identity information of the first terminal device, and may include at least one of an SUCI, an SUPI, an MSISDN, or a temporary identifier. In addition, in a process in which the first terminal device sends the access request to the AMF network element through the access network, the access network inserts the access location information of the first terminal device into the access request, or sends the access location information of the first terminal device and the access request to the AMF network element, so that the AMF network element receives the access location information and the identifier of the first terminal device.

Step A2: The AMF network element sends a subscription information obtaining request to the UDM network element, where the subscription information obtaining request includes the identifier of the first terminal device.

After the AMF network element sends the subscription information obtaining request that includes the identifier of the first terminal device to the UDM network element, the UDM network element may obtain, based on the identifier, the subscription information corresponding to the first terminal device, where the subscription information records the location area (that is, the subscription location information) in which the first terminal device is allowed to access the network.

Step A3: The AMF network element receives the subscription information sent by the UDM network element based on the identifier of the first terminal device.

Step A4: The AMF network element determines whether the subscription location information in the subscription information includes the access location information.

After receiving the subscription information corresponding to the first terminal device that is sent by the UDM network element, the AMF network element may further determine whether the subscription information records the access location information of the first terminal device that is received in step A1. If the subscription information records the access location information of the first terminal device that is received in step A1, it indicates that the first terminal device can access the network based on the access location information. If the subscription information does not record the access location information of the first terminal device that is received in step A1, it indicates that the access location information does not belong to the subscription location information, and a next step A5 needs to be performed.

For example, it is assumed that the subscription information corresponding to the first terminal device records location area information that allows the first terminal device to perform network registration, for example, a line ID list that allows network access, a line ID list that does not allow network access (indicating that the access can be performed from a location area in another list), or the like. Further a result of determining whether a line ID corresponding to the access location information of the first terminal device is valid access location information is obtained by determining whether the line ID corresponding to the access location information of the first terminal device belongs to the line ID list that is recorded in the subscription information and that allows network access or the line ID list that does not allow network access.

Step A5: The AMF network element determines whether the subscription information includes the first parameter. If the subscription information includes the first parameter, the AMF network element further determines, based on the first parameter in the subscription information, whether the first terminal device can access the network at the access location corresponding to the access location information. The first parameter includes the indication information, the identifier of the first terminal device, and/or the type of the first terminal device.

If it is determined in step A4 that the subscription location information in the subscription information does not include the access location information, that is, the access location information does not belong to the subscription location information, the AMF network element further needs to determine whether the subscription information includes the first parameter (used to indicate that when the access location information of the first terminal device does not belong to the subscription location information, the first terminal device is allowed to access the network at the access location corresponding to the access location information). When it is determined that the subscription information includes the first parameter, the AMF network element allows the first terminal device to access the network at the access location corresponding to the access location information. Alternatively, the AMF network element may allow, based on the identifier of the first terminal device or the type of the first terminal device, the first terminal device to access the network at the non-subscribed access location. For example, the first terminal device may be identified as a special terminal device by using the identifier of the first terminal device or the type of the first terminal device, and the special terminal device is allowed to access the network at the non-subscribed access location.

Step A6: The AMF network element sends at least one of first indication information, information about the terminal device, and an identifier of the access management network element corresponding to the terminal device to the network element A.

As described in the foregoing descriptions of the network element A 103, the network element A is an application function network element that can provide a service for a mobile terminal.

When it is determined in step A5 that the subscription information does not include the first parameter, the AMF network element may send at least one of the first indication information, the information about the terminal device, the access location information of the first terminal device, and the identifier of the access management network element corresponding to the terminal device to the network element A, to obtain the allowed information from the network element A. In addition, when only the access location information of the first terminal device is sent, the information may be carried in a newly added field to indicate the second network element to obtain the allowed information.

The first indication information is used to indicate the network element A to obtain the allowed information, and the first indication information is parameter information or a message type. The information about the terminal device is the identifier of the first terminal device or the identifier of the second terminal device. The identifier of the second terminal device is a user identifier representing identity information of the second terminal device, and may include at least one of an SUCI, an SUPI, an MSISDN, or a temporary identifier. The second terminal device is another terminal device other than the first terminal device. The identifier of the second terminal device may have a specific mapping relationship with the identifier of the first terminal device. Alternatively, the second terminal device may be a terminal device through which a user logs in to an account of social software (such as an email or WeChat).

Further, the second network element may obtain the allowed information from the terminal device based on the information about the terminal device and the AMF network element corresponding to the terminal device. For a specific implementation process, refer to detailed descriptions in subsequent embodiments.

Figure 4:
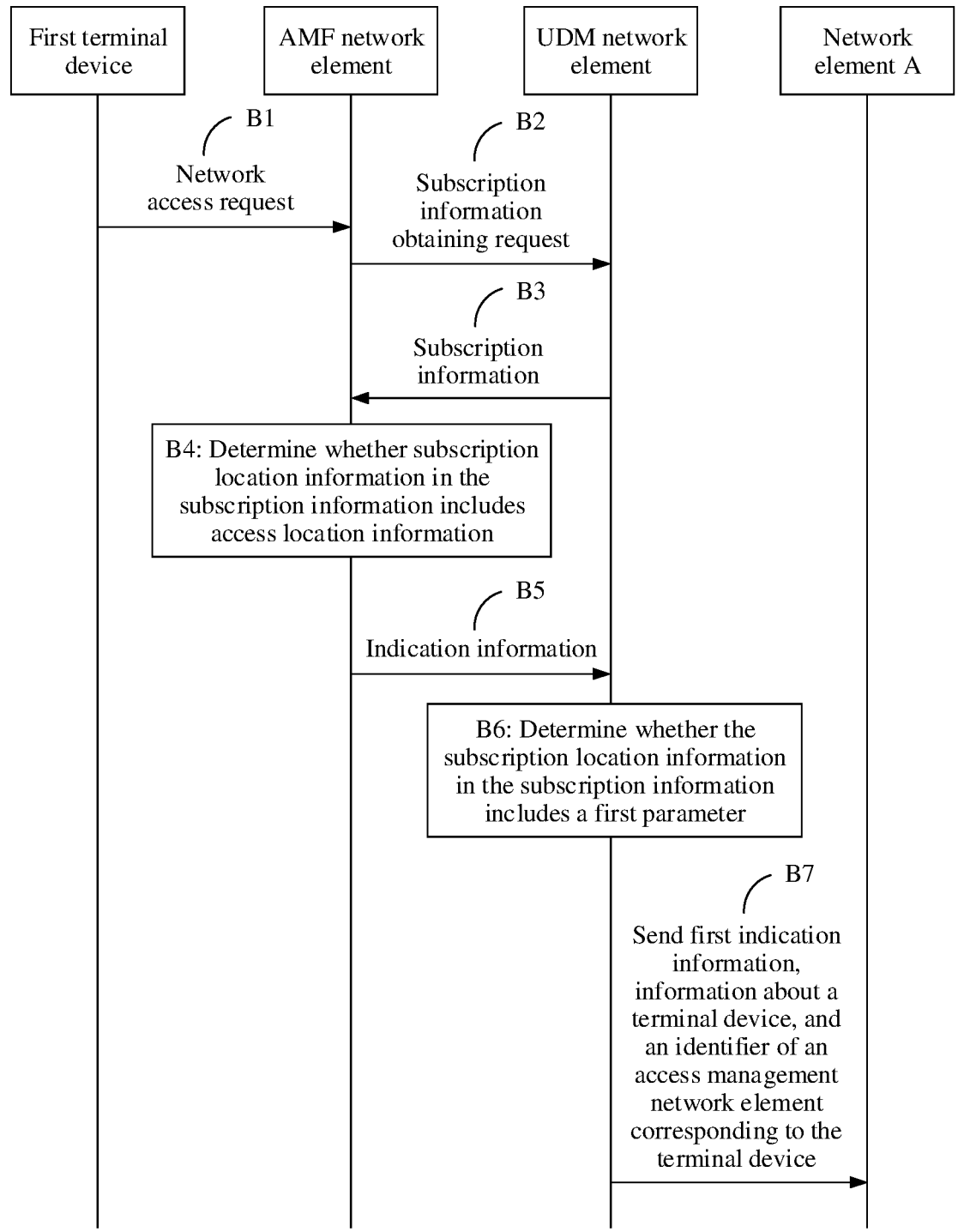
FIG. 4 is a flowchart of a network access method according to an embodiment of this application.

(2) In a first implementation of this embodiment, the first network element is, for example, the UDM network element, and the second network element is still the network element A. As shown in FIG. 4, a specific implementation process may include the following steps B1 to B7.

Step B1: The AMF network element receives the access request sent by the first terminal device, where the access request includes the identifier of the first terminal device.

Step B2: The AMF network element sends a subscription information obtaining request to the UDM network element, where the subscription information obtaining request includes the identifier of the first terminal device.

Step B3: The AMF network element receives the subscription information sent by the UDM network element based on the identifier of the first terminal device.

Step A4: The AMF network element determines whether the subscription location information in the subscription information includes the access location information.

It should be noted that steps B1 to B4 are consistent with the foregoing steps A1 to A4. For related parts, refer to descriptions of steps A1 to A4, and details are not described herein again.

Step B5: The AMF network element sends indication information to the UDM network element.

The indication information indicates that the access location information of the first terminal device does not belong to the subscription location information.

Step B6: The UDM network element determines whether the subscription information includes the first parameter. If the subscription information includes the first parameter, the UDM network element further determines, based on the first parameter in the subscription information, whether the first terminal device can access the network at the access location corresponding to the access location information. The first parameter includes the indication information, the identifier of the first terminal device, and/or the type of the first terminal device.

After determining that the received indication information that is sent by the AMF network element and that indicates that the access location information of the first terminal device does not belong to the subscription location information, the UDM network element further needs to determine whether the subscription information includes the first parameter. When determining that the subscription information includes the first parameter, the UDM network element may allow, based on the access location information of the first terminal device, the first terminal device to access the network at the access location corresponding to the access location information. Alternatively, the UDM network element may allow, based on the identifier of the first terminal device or the type of the first terminal device, the first terminal device to access the network at the non-subscribed access location.

Step B7: The UDM network element sends at least one of first indication information, information about the terminal device, and an identifier of an access management network element corresponding to the terminal device to the network element A.

Step B7 is basically the same as step A6, except that the execution bodies of the steps are different. Step A6 is performed by the AMF network element, and step B7 is performed by the UDM network element. Therefore, step B7 is not described herein again. For related content, refer to step A6.

Figure 5:
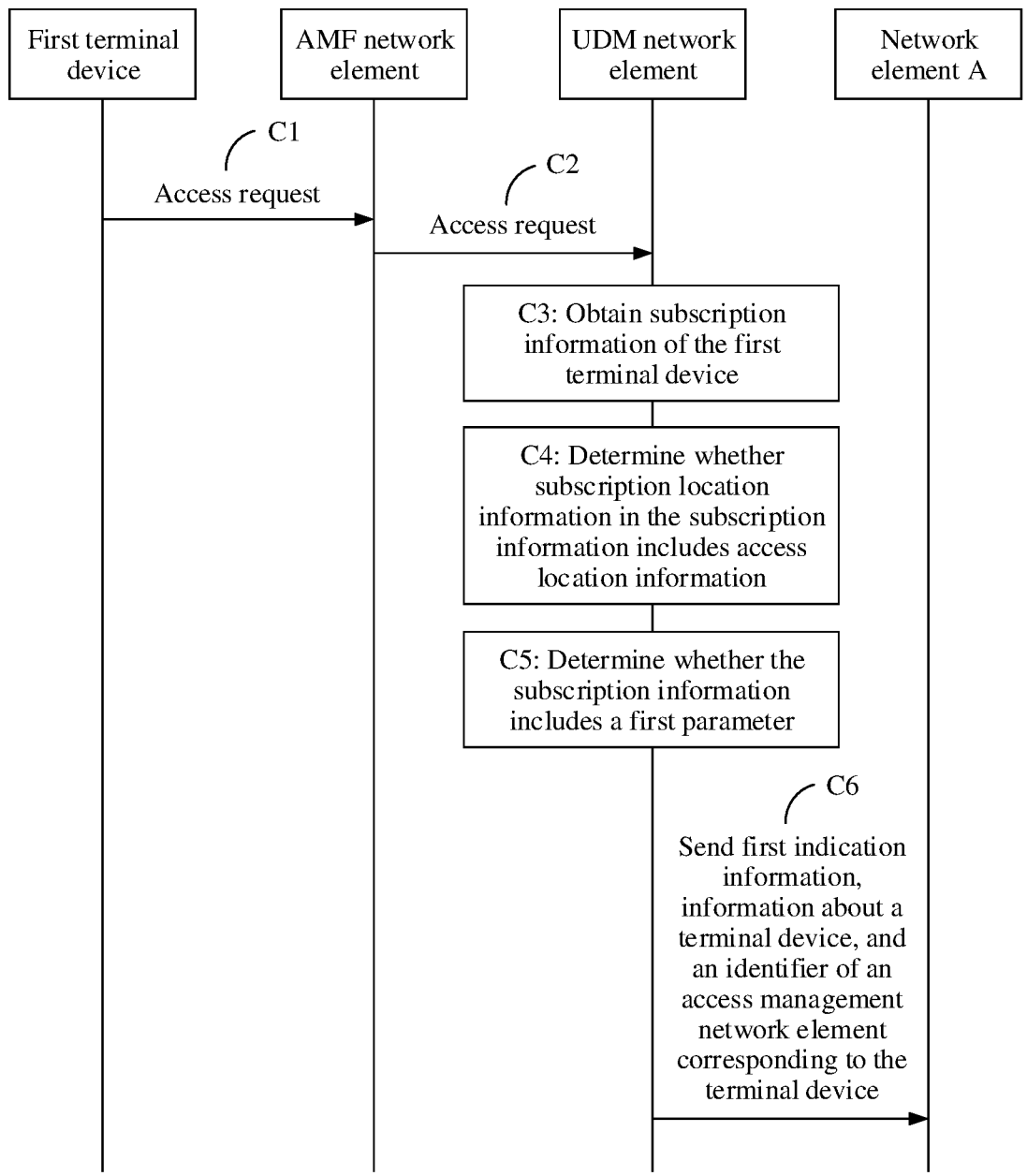
FIG. 5 is a flowchart of a network access method according to an embodiment of this application.

(3) In a first implementation of this embodiment, the first network element is, for example, the UDM network element, and the second network element is still the network element A. As shown in FIG. 5, a specific implementation process may include the following steps C1 to C6.

Step C1: The AMF network element receives the access request sent by the first terminal device, where the access request includes the identifier of the first terminal device.

Step C2: The AMF network element sends the access request to the UDM network element, where the access request includes the access location information and the identifier of the first terminal device.

Step C3: The UDM network element obtains, based on the identifier of the first terminal device, the subscription information corresponding to the first terminal device, where the subscription information records the location area (that is, subscription location information) in which the first terminal device is allowed to access the network.

Step C4: The UDM network element determines whether the subscription location information in the subscription information includes the access location information.

The UDM network element determines whether the subscription location information in the subscription information records the access location information of the first terminal device. If the subscription location information records the access location information, it indicates that network access of the first terminal device can be implemented based on the access location information. If the subscription location information does not record the access location information, it indicates that the access location information does not belong to the subscription location information, and a next step C5 needs to be performed.

Step C5: The UDM network element determines whether the subscription information includes the first parameter. If the subscription information includes the first parameter, the UDM network element further determines, based on the first parameter in the subscription information, whether the first terminal device can access the network at the access location corresponding to the access location information. The first parameter includes the indication information, the identifier of the first terminal device, and/or the type of the first terminal device.

After determining that the access location information of the first terminal device does not belong to the subscription location information, the UDM network element further needs to determine whether the subscription information includes the first parameter. When it is determined that the subscription information includes the first parameter, the UDM network element may allow the first terminal device to access the network at the access location corresponding to the access location information. Alternatively, the UDM network element may allow, based on the identifier of the first terminal device or the type of the first terminal device, the first terminal device to access the network at the non-subscribed access location.

Step C6: The UDM network element sends at least one of first indication information, information about the terminal device, and an identifier of an access management network element corresponding to the terminal device to the network element A.

It should be noted that step C6 is consistent with the foregoing step B7. For related parts, refer to the description of step B7. Details are not described herein again.

Figure 6:
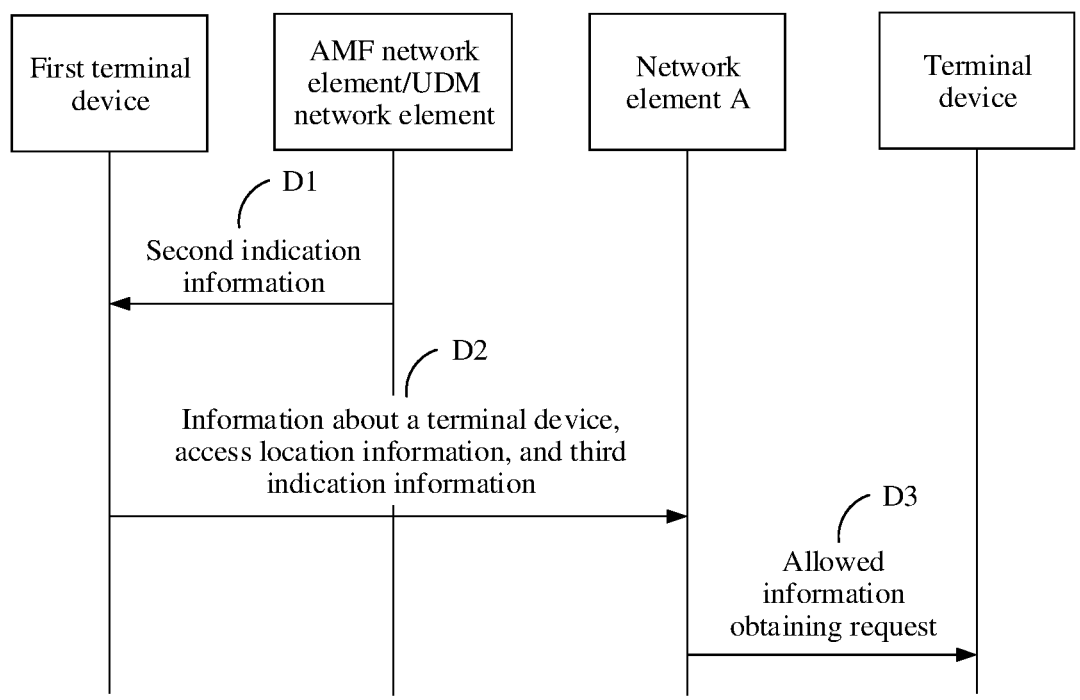
FIG. 6 is a flowchart of a network access method according to an embodiment of this application.

(4) In the first implementation of this embodiment, as shown in FIG. 6, a specific implementation process may include the following steps D1 to D3.

Step D1: The first terminal device receives second indication information sent by the first network element (the AMF network element or the UDM network element).

The second indication information may include an identifier of the second network element (which may be one or more of an Internet protocol (IP) address of the second network element and the network name of the network element) and/or information indicating that the first terminal device is in an access restricted state (that is, information about that the first terminal device cannot normally access the network because the access location corresponding to the access location information is an unsubscribed location). In addition, the indication information also indicates that the first terminal device needs to establish a session used for communication with the second network element (that is, the network element A), to implement a subsequent network access function. To be specific, the second indication information is used to indicate the first terminal device to establish a PDU session to the network element A, so that the first terminal device and the network element A can exchange session data by using the PDU session.

Figure 7:
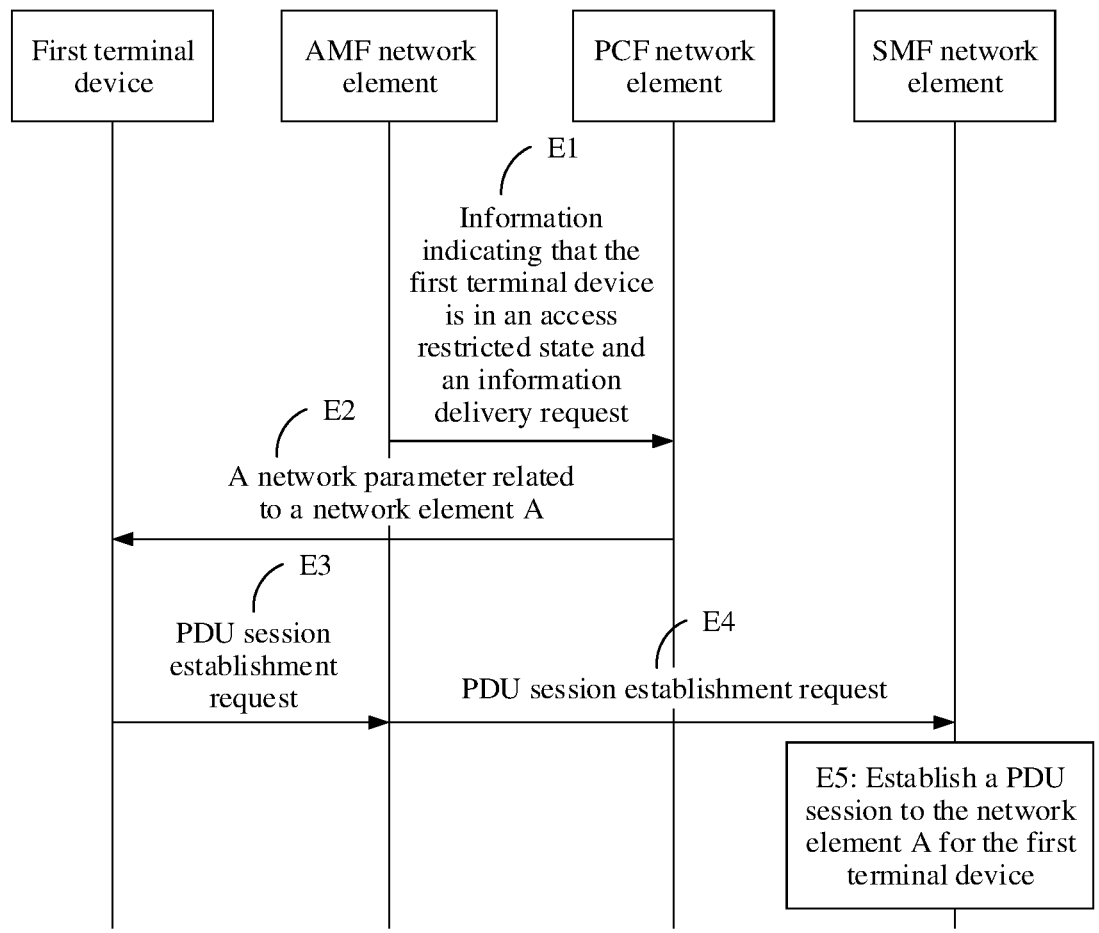
FIG. 7 is a schematic diagram of establishing a PDU session from a first terminal device to a network element A according to an embodiment of this application.

Next, as shown in FIG. 7, in embodiments of this application, a specific implementation process in which the first terminal device establishes the PDU session is described by using the following steps E1 to E5.

Step E1: The first network element (for example, the AMF network element) sends, to a PCF network element (and/or an SMF), information indicating that the first terminal device is in the access restricted state and the identifier of the first terminal device.

After receiving the information indicating that the first terminal device is in the access restricted state and the identifier of the first terminal device, the PCF network element may further send a network parameter related to the network element A to the first terminal device corresponding to the identifier of the first terminal device. The network parameter is used to establish the PDU session from the first terminal device to the network element A.

Step E2: The PCF network element sends the network parameter related to the network element A to the first terminal device.

The network parameter related to the network element A may include one or more items of a data network name (DNN) of a network in which the network element A is located and an IP address or a fully qualified domain name (FQDN) of the network element A. In addition, to establish the PDU session from the first terminal device to the network element A, the network parameter related to the network element A may further include a session type of the PDU session that needs to be established.

Step E3: The first terminal device sends a PDU session establishment request to the SMF network element.

The PDU session establishment request is used to indicate the SMF network element to establish the PDU session to the network element A for the first terminal device.

Specifically, the first terminal device may send a non-access stratum (NAS) transmission message to the AMF network element, where the transmission message includes the PDU session establishment request message. In addition, the NAS transmission message and/or the PDU session establishment request message include the network parameter related to the network element A.

The network parameter related to the network element A is used to indicate the SMF network element to establish the PDU session to the network element A for the first terminal device.

Step E4: The AMF network element forwards the received PDU session establishment request to the SMF network element.

Alternatively, the PDU session establishment request and the access location information of the first terminal device may be sent to the SMF network element through the AMF network element, so that the SMF network element performs step E5.

Step E5: The SMF network element establishes the PDU session to the network element A for the first terminal device.

Specifically, the SMF network element may send a session establishment request message to the UPF network element, where the request message includes a session identifier and an online registration indication, to indicate the UPF to route all data packets of the PDU session to the network element A, to establish the PDU session between the first terminal device and the network element A. In embodiments of this application, the online registration is a procedure that is performed when the first terminal device is in the access restricted state and that is performed to allow the first terminal device to access the network. The online registration indication is used to indicate to perform an online registration procedure for the first terminal device, or used to indicate the first terminal device to perform a procedure of the access restricted state when the first terminal device is currently in the access restricted state. The foregoing online registration procedure or the procedure in the access restricted state is routing or redirecting a data packet of the first terminal device to the network element A.

For example, it is assumed that the network element A is an online registration system. To implement the online registration, the SMF network element may send the session establishment request message to the UPF network element. The request message includes at least one of the session identifier, a name (or an IP address) of a network in which the online registration system is located, and the online registration indication, to indicate the UPF to route all the data packets of the PDU session to the online registration system, to establish the PDU session from the first terminal device to the online registration system. The PDU session is a PDU session that can reach the online registration system. In other words, all service flow data packets can only be routed or redirected (for data packets whose destination address is not the online registration system) to the online registration system.

Step D2: The first terminal device sends at least one of the information about the terminal device, the access location information, and third indication information to the network element A.

At least one of the information about the terminal device, the access location information, and the third indication information is used to indicate the second network element to obtain the allowed information. In addition, the information about the terminal device may be carried in a newly added field or a newly added message, to indicate to obtain the allowed information based on the information about the terminal device.

Step D3: The network element A sends an allowed information obtaining request to the terminal device, to obtain the allowed information that allows the first terminal device to access the network at the access location corresponding to the access location information.

Specifically, after the session for communication between the first terminal device and the second network element (namely, the network element A) is established, the first terminal device may send at least one of the terminal device identifier, the access location information, and the third indication information to the network element A through a session channel, to indicate the network element A to send the allowed information obtaining request to the terminal device, to obtain the allowed information for allowing the first terminal device to access the network at the access location corresponding to the access location information.

The terminal device may include at least one of the first terminal device and the second terminal device, and the second terminal device is another terminal device before the first terminal device. For specific description, refer to the foregoing embodiments.

It should be further noted that, in an optional implementation, before performing step D2, the first network element further needs to send an information sending indication to a network element B, where the information sending indication is used to indicate the network element B to deliver address information of the network element A to the first terminal device. The address information is used by the first terminal device to establish a connection to the network element A, to send at least one of the terminal device identifier, the access location information, and the third indication information to the first terminal device.

Specifically, in this implementation, similar to the network element A, the network element B may be an AF network element that provides a service, and may directly exchange data with the first terminal device, to provide a corresponding service for the first terminal device. Based on this, when the first terminal device cannot transmit data with the network element A, the first terminal device may also obtain the address information of the network element A through the network element B (for example, one or more of a network name of a network where the network element A is located and an IP address and FQDN of network element A). Then, a connection to the network element A may be established by the first terminal device by using the address information, to implement a subsequent network access procedure.

In embodiments of this application, after a network access procedure of the first terminal device is triggered by using at least one of the foregoing implementations (1), (2), (3), and (4), a step of obtaining the allowed information by the second network element may be further implemented. A specific implementation process may include the following steps F1 to F2.

Step F1: The second network element sends an allowed information obtaining request to the terminal device.

The allowed information obtaining request includes the access location information of the first terminal device, and the allowed information obtaining request is used to determine whether the first terminal device can access the network at the access location corresponding to the access location information. The terminal device includes at least one of the first terminal device and the second terminal device. Specifically, a specific implementation process of obtaining the allowed information through interaction between the first terminal device or the second terminal device and the network element A may include the following two implementations.

Figure 8:
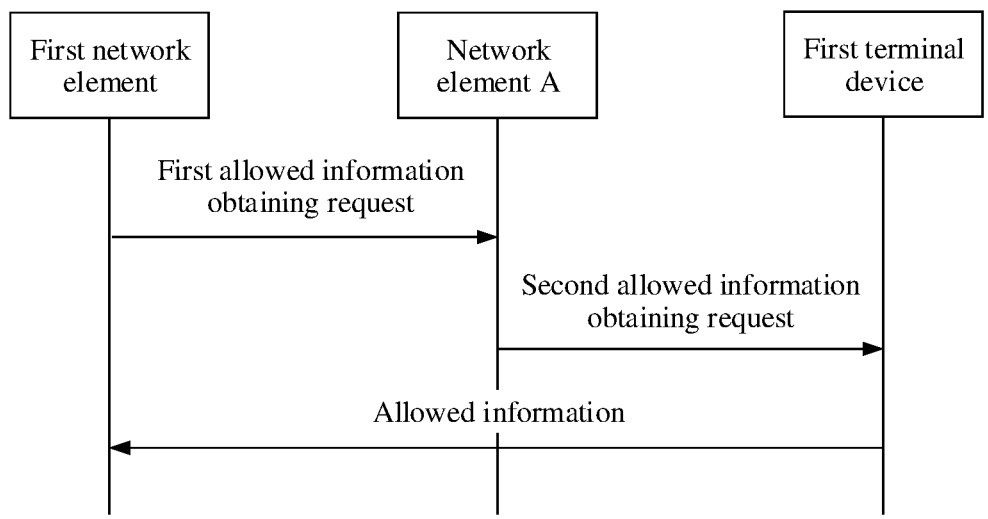
FIG. 8 is a first schematic interaction diagram in which a second network element obtains allowed information according to an embodiment of this application.

(1) In a first implementation, the allowed information is obtained through the first terminal device. As shown in FIG. 8, a specific implementation process of step F1 may include: The first network element sends a first allowed information obtaining request including the identifier of the first terminal device and/or the access location information to the network element A, so that the network element A sends a second allowed information obtaining request to the first terminal device based on content included in the allowed information obtaining request.

The first allowed information obtaining request sent by the first network element to the network element A also includes at least one of the first indication information (for example, an online registration indication), the information about the terminal device, and the identifier of the access management network element corresponding to the terminal device sent by the AMF network element to the network element A in step A6, or includes at least one of the first indication information (for example, an online registration indication), the information about the terminal device, and the identifier of the access management network element corresponding to the terminal device sent by the UDM network element to the network element A in step B7, or includes at least one of the first indication information (for example, an online registration indication), the information about the terminal device, and the identifier of the access management network element corresponding to the terminal device sent by the UDM network element to the network element A in step C6, or includes at least one of the terminal device identifier, the access location information, and the third indication information sent by the first terminal device to the network element A in step D2.

After receiving the first allowed information obtaining request, the network element A may send the second allowed information obtaining request to the first terminal corresponding to the identifier of the first terminal device included in the first allowed information obtaining request, where the second allowed information obtaining request may include the first terminal identifier and/or the access location information of the first terminal device. Further, the first terminal device may send the allowed information to the network element A (that is, the second network element) through the session channel pre-established with the network element A, to confirm that the first terminal device is allowed to access the network at the access location corresponding to the access location information. In other words, the second network element may perform an interactive operation with the first terminal device to determine whether the first terminal device accesses the network at the access location corresponding to the access location information.

For example, it is assumed that the network element A is the online registration system, the first network element is the AMF network element, and the first terminal device is a device A of a user. The AMF network element first sends, to the SMF network element, the first allowed information obtaining request that includes at least one of the identifier (for example, an SUPI) of the device A, the access location information, and the first indication information, the SMF network element may forward the at least one of the foregoing parameters included in the first allowed information obtaining request to the UPF network element, and then the UPF network element establishes a PDU session to the online registration system for the device A. In addition, the SMF network element may send the first allowed information obtaining request to the online registration system, or the device A sends the first allowed information obtaining request to the online registration system through the PDU session. Further, the online registration system may push, to the device A, a registration page on which information needs to be filled by the user. For example, an access location parameter (for example, line ID) of the device A may be first converted into location information that can be read by the user (for example, No. xx, xx community, xx street, xx city). Then, the information is displayed on the registration page correspondingly, so that the user fills in corresponding registration information on the page, such as a registration type, a service type, bandwidth, and a validity period. In other words, whether the device A can access the network at the location corresponding to the access location information is determined. Content of the registration information is returned to the online registration system through the device A.

(2) In a second implementation, the subscription information includes a mapping relationship between the identifier of the first terminal device and the identifier of the second terminal device, and the mapping relationship refers to a correspondence between the identifier of the first terminal device and the identifier of the second terminal device. Based on this, the first network element may obtain the corresponding identifier of the second terminal device based on the identifier of the first terminal device and the mapping relationship. In other words, when the identifier of the first terminal device is known, the identifier of the second terminal device may be obtained based on the correspondence.

Figure 9:
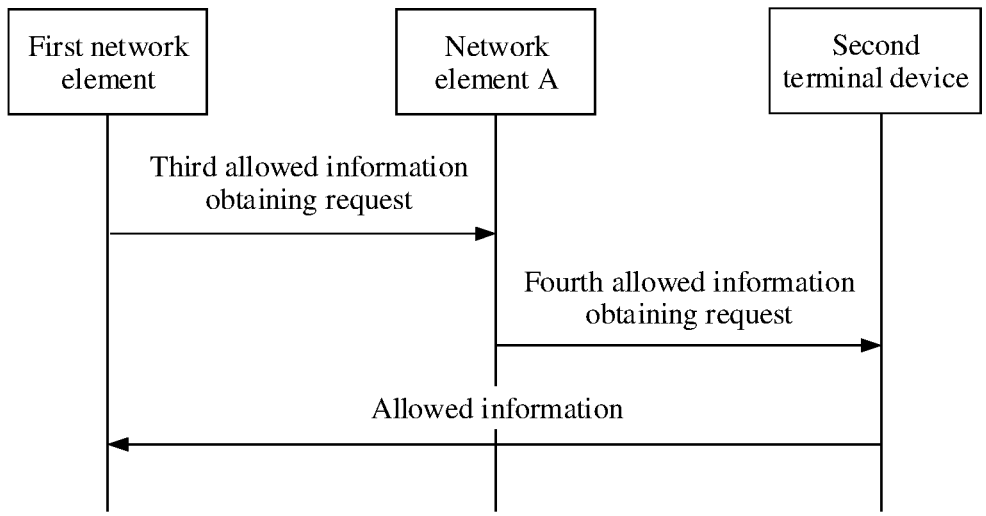
FIG. 9 is a second schematic interaction diagram in which a second network element obtains allowed information according to an embodiment of this application.

Based on this, in this implementation, if the first terminal device is a terminal device (for example, a 5G-RG) without a human-machine interaction interface, the identifier of the second terminal device may be obtained based on the correspondence, and the allowed information from the second terminal device is obtained when the identifier of the first terminal device is known. As shown in FIG. 9, a specific implementation process of step F1 may include: The first network element sends a third allowed information obtaining request including the identifier and/or the access location information of the first terminal device to the network element A, so that the network element A sends a fourth allowed information obtaining request to the second terminal device.

The third allowed information obtaining request sent by the first network element to the network element A may also include at least one of the first indication information, the information about the terminal device, and the identifier of the access management network element corresponding to the terminal device sent by the AMF network element to the network element A in step A6, or include at least one of the first indication information, the information about the terminal device, and the identifier of the access management network element corresponding to the terminal device sent by the UDM network element to the network element A in step B7, or include at least one of the first indication information, the information about the terminal device, and the identifier of the access management network element corresponding to the terminal device sent by the UDM network element to the network element A in step C6, or includes at least one of the terminal device identifier, the access location information, and the third indication information sent by the first terminal device to the network element A in step D2.

After receiving the third allowed information obtaining request, the network element A may send a fourth allowed information obtaining request to the second terminal device corresponding to the identifier of the second terminal device included in the third allowed information obtaining request, where the fourth allowed information obtaining request may include the access location information of the first terminal device. Further, the network element A may perform an interaction operation with the second terminal device to confirm whether the first terminal device accesses the network corresponding to the access location information.

For example, it is assumed that the network element A is the online registration system, the first network element is the AMF network element, the first terminal device is the 5G-RG, the second terminal device is a mobile phone B of a user, and there is a one-to-one correspondence between an identifier of the 5G-RG and an identifier of the mobile phone B. The AMF network element sends, to the SMF network element or the online registration system, the third access acknowledgment request that includes the identifier of the second terminal device and the access location information. The SMF network element may forward the third allowed information obtaining request to the UPF network element, and then the UPF network element may send the third allowed information obtaining request to the online registration system.

Further, the online registration system may push, to the mobile phone B, a registration page on which information needs to be filled by the user. For example, an access location parameter (for example, line ID) of the 5G-RG (the first terminal device) may be first converted into location information that can be read by the user. Then, the information is displayed on the registration page correspondingly, so that the user fills in corresponding registration information on the page, such as a registration type, a service type, bandwidth, and a validity period. In other words, whether the first terminal device (the 5G-RG) can access the network at the location corresponding to the access location information is determined. Content of the registration information is returned to the online registration system through the mobile phone B.

It should be noted that the second terminal device may alternatively be a terminal device through which the user logs in to an account of social software (such as an email or WeChat) through the second terminal device, and is configured to perform the foregoing steps. A specific implementation process is similar to the foregoing process, and details are not described herein again.

Figure 10:
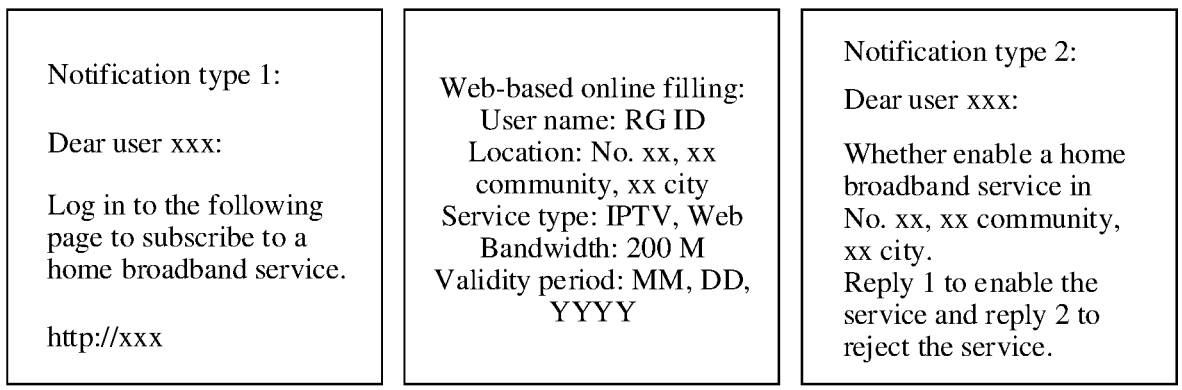
FIG. 10 is a schematic diagram of content of an SMS sent to a terminal device according to an embodiment of this application.

It should be noted that, in the foregoing two examples, an existing or future SMS triggering procedure may also be used to determine whether the first terminal device is allowed to access the network at the access location corresponding to the access location information. For example, the network element A may initiate an SMS to the first terminal device or the second terminal device. Content and a display form of the SMS are not limited in embodiments of this application, and may be configured based on an actual situation. For example, the content and the display form of the SMS may be the three cases shown in FIG. 10. If the SMS is an SMS displayed on the left figure of FIG. 10, the user clicks a related website link through the first terminal device or the second terminal device, and logs in to the online registration system to fill in corresponding registration information. Alternatively, as shown in the middle and right figures of FIG. 10, some content of SMSs are automatically displayed for confirmation by the user, such as a user name and location. Registration information that the user needs to fill in is also displayed, such as a service type, bandwidth, and a validity period.

Alternatively, the network element A may first send an external identifier of the first terminal device or the identifier of the first terminal device to the NEF network element, and then the NEF network element sends the external identifier of the first terminal device or the identifier of the first terminal device to the UDM network element. The external identifier of the first terminal device is identification information that identifies the first terminal device on the network element A, for example, a general public subscription identifier (GPSI: Generic Public Subscription Identifier). The external identifier of the first terminal device may be the same as or different from the identifier of the first terminal device. The UDM network element may search for subscription data of the first terminal device based on the identifier of the first terminal device or the external identifier of the first terminal device, obtain an identifier of the second terminal device, and send the identifier of the second terminal device to the NEF network element. Further, the NEF network element may initiate an SMS procedure to the second terminal device corresponding to the identifier of the second terminal device. For example, the NEF network element sends the identifier of the second terminal device to the UDM element, to obtain an SMSF (Short Message Service Function) identifier corresponding to the second terminal device returned by the UDM element. Subsequently, the SMSF sends the SMS to the second terminal device based on an existing procedure. Alternatively, the NEF network element sends the identifier of the first terminal device to the UDM network element, and the UDM returns the SMSF identifier corresponding to the second terminal device. Subsequently, the SMSF sends the SMS to the second terminal device based on the existing procedure. The content and the display form of the SMS are not limited in embodiments of this application, and may be configured based on an actual situation. For example, the content and the display form of the SMS may be the three cases shown in FIG. 1.

Step F2: The second network element receives the allowed information from the terminal device, and sends the allowed information to the first network element, so that the first network element allows, based on the allowed information, the first terminal device to access the network at the access location corresponding to the access location information.

After sending the access allowed information obtaining request to the terminal device, the second network element receives the allowed information returned by the terminal device. Then, the second network element may send the allowed information to the first network element, so that the first network element allows, based on the allowed information, the first terminal device to access the network at the access location corresponding to the access location information. It may be understood that the terminal device may also directly send the allowed information to the first network element. A specific implementation may be selected based on an actual situation. This is not limited in embodiments of this application.

For example, it is assumed that the network element A is the online registration system, and the first network element is the AMF network element or the UDM network element. The terminal device may send the allowed information to the online registration system, and the online registration system may send the allowed information to the AMF network element or the UDM network element. Alternatively, the online registration system may first send the allowed information to the NEF network element, and then the NEF network element forwards the allowed information to the AMF network element or the UDM network element. The allowed information may include one or more of the identifier of the first terminal device, the access location information (for example, a line ID), the service type, and the validity period (for example, the validity period is until MM DD, YYYY).

It should be noted that, in a possible implementation of this application, that the "the first network element obtains allowed information" in step S203 may further include: The first network element obtains a first parameter in the subscription information, where the first parameter indicates that when the access location information of the first terminal device does not belong to the subscription location information, the first terminal device is allowed to access the network at the access location corresponding to the access location information.

In this implementation, if the first network element obtains the first parameter by analyzing the subscription information after obtaining the subscription information of the first terminal device, and the first parameter indicates that when the access location information of the first terminal device does not belong to the subscription location information, the first terminal device is allowed to access the network at the access location corresponding to the access location information. Therefore, it indicates that the first network element does not need to obtain the allowed information from the second network element by using the foregoing steps, and the first network element may directly allow, based on the first parameter included in the subscription information, the first terminal device to access the network at the access location corresponding to the access location information, thereby quickly and conveniently implementing network access of the first terminal device.

Further, when the first network element is an access management network element (for example, an AMF network element or an MME network element), after obtaining the allowed information, the access management network element notifies, by sending a message, that the first terminal device can access the network at the access location corresponding to the access location information. Optionally, the AMF network element may delete an access restriction indication of the first terminal device. In addition, the AMF sends a subscription information update request to the UDM network element, to complete subscription information update. The subscription information update request includes the access location information of the first terminal device. The subscription information update request is used to update the subscription location information of the first terminal device based on the access location information of the first terminal device. For example, the access location information of the first terminal device is used as the subscription location information of the first terminal device.

Specifically, after obtaining the allowed information and determining that the first terminal device can access the network at the access location corresponding to the access location information, the AMF network element may send, to the UDM network element, the subscription information update request including the access location information (for example, a line ID) of the first terminal device. In this way, the UDM network element updates the subscription information corresponding to the first terminal device. In other words, the UDM network element may write the access location information (for example, a line ID) of the first terminal device into a list of allowed access areas (line ID list). In addition, a service type and an access validity period related to a location area can be stored in the allowed information. In addition, the UDM network element may also send the subscription information updated by the first terminal device to a UDR for data storage.

Alternatively, when the first network element is the UDM network element, after the network element A or the terminal device sends the allowed information to the UDM network element, that is, after obtaining the allowed information, the UDM network element determines that the first terminal device is allowed to access the network at the access location corresponding to the access location information. The UDM network element may update, based on the access location information of the first terminal device included in the allowed information, the subscription information corresponding to the first terminal device, for example, use the access location information of the first terminal device as the subscription location information of the first terminal device. In addition, the UDM network element sends updated subscription data to the AMF network element, where the updated subscription data includes the access location information of the first terminal device as the subscription location information, to indicate that the access location information of the first terminal device belongs to the subscription location information, so that the AMF network element provides a service for the first terminal device (that is, the first terminal device is allowed to access the network at the access location corresponding to the access location information). Optionally, the AMF network element may delete an access restriction indication of the first terminal device. In addition, the AMF network element notifies the first terminal device that the first terminal device can access the network at the access location corresponding to the access location information.

Specifically, after the network element A or the terminal device sends, to the UDM network element, the allowed information including information such as the access location information and the identifier of the first terminal device, the UDM network element may write the access location information (for example, a line ID) of the first terminal device into the list of allowed access areas (line ID list). In addition, the service type and the access validity period related to the location area can be stored in the allowed information. In addition, the UDM network element may also send the updated subscription information of the first terminal device to the UDR for data storage, and send the updated subscription information to the AMF network element, to indicate that the access location information of the first terminal device belongs to the subscription location information, so that the AMF network element provides a normal service for the first terminal. Optionally, the AMF network element notifies the first terminal device that the first terminal device may access the network at the access location corresponding to the access location information.

Alternatively, the network element A or the terminal device may first send the allowed information to the UDR network element through the NEF network element, to update the subscription information of the first terminal device. Then the UDR network element sends a subscription information update indication to the UDM network element, to indicate the UDM network element to update the subscription information of the first terminal device, so that the UDM network element may send the updated subscription information to the AMF network element, to indicate that the access location information of the first terminal device belongs to the subscription location information, so that the AMF network element provides a normal service for the first terminal (that is, the first terminal device is allowed to access the network at the access location corresponding to the access location information). Optionally, the AMF network element notifies the first terminal device that the first terminal device may access the network at the access location corresponding to the access location information.

It should be noted that, before step F1 is performed, that is, before the first network element sends the allowed information obtaining request to the terminal device, the first network element and/or an access network side (for example, a RAN) may start a first timer, to implement real-time monitoring on a network access time. In addition, before the first timer expires, if the first network element receives the allowed information from the terminal device, the first network element deletes the timer. Otherwise, when an access procedure of the terminal device is still incomplete or unsuccessful after the first timer expires, the first network element and/or the access network side (for example, the RAN) rejects the access request of the terminal device.

Specifically, the first network element (for example, the AMF network element or the UDM network element) may locally set a timer for a long time for a network access procedure, to real-time monitor the network access procedure. Before a timing time of the timer reaches an end of a first preset time period, if the first network element receives the allowed information of the terminal device, the first network element may determine, based on the allowed information, that the first terminal device is allowed to access the network at the access location corresponding to the access location information. Further, the first network element may send the allowed information to the first terminal device. The first preset time period refers to a preset maximum time required for the first terminal device to access the network once. If the time exceeds the time period, it indicates that network access fails, and a next network access operation needs to be performed again.

In addition, in an optional implementation, if an access procedure of the first terminal device fails or the first network element does not receive an access acknowledgment message from the terminal device after the first timer expires, the first network element may send a second timer to the first terminal device, where the second timer is used to indicate the first terminal device to send the access request after the second timer expires. In other words, the first terminal device is indicated not to send the access request to the network before the second timer expires.

In this implementation, if the first network element still does not receive the allowed information sent by the terminal device after the first timer expires, the first network element may determine that the access location information of the first terminal device does not belong to the subscription location information, that is, the first terminal device is not allowed to access the network at the access location corresponding to the access location information. In this case, the first network element may send second timer information to the first terminal device, where the second timer information is used to indicate the first terminal device to send the access request after a second timer expires.

A waiting time period may be set by using the second timer, to indicate the first terminal device to re-perform a next network access operation after the waiting time meets a time period (that is, the second timer expires), that is, resend an access request.

It should be noted that, in addition to the first network element, the first terminal device may further initiate real-time monitoring of a time of network access. Specifically, the first terminal device may add a "long-time network access" indication message in information (for example, a Message 3 or a Message 5) exchanged by a logical network element of a radio access network (RAN), to indicate that the network access process may take a long time. After receiving the indication message, the RAN may locally start the first timer for the network access procedure, to monitor the network access procedure. After the first timer expires, if the network access procedure does not end normally, for example, the RAN has not received any N2 message (for example, a downlink NAS transport message or an initial context setup request message) sent by the AMF network element, it may be determined that network access here fails, and air interface connection to the first terminal device needs to be disconnected.

Figure 11:
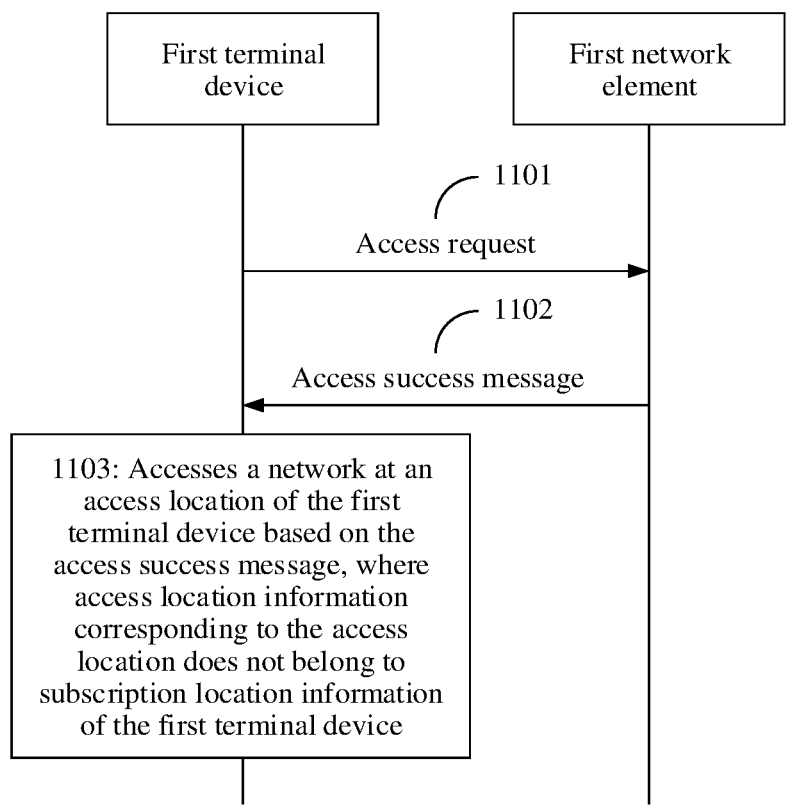
FIG. 11 is a flowchart of another network access method according to an embodiment of this application.

FIG. 11 is a flowchart of another network access method according to an embodiment of this application. The following describes the method.

S101: A first terminal device sends an access request to a first network element.

The access request represents that the first terminal device needs to access a network, and the access request does not include access location information of the first terminal device. However, the access request message may include a "long-time network access" indication message, to indicate that a network access process may require a long time.

S1102: The first terminal device receives an access success message sent by the first network element based on the access request.

After the first terminal device sends the access request to the first network element through the access network, the first network element may obtain the access success message based on the access request by performing steps S202 to S204, and may send the access success message to the first terminal device. For related content, refer to the detailed description of the foregoing steps S202 to S204.

It should be noted that, before step S1102 is performed, the following steps G1 to G3 may be performed first, so that a second network element may obtain allowed information from the first terminal device, and feed back the allowed information to the first network element.

Step G1: The first terminal device receives an access acknowledgment request from the second network element.

The access acknowledgment request is the "second allowed information obtaining request" described in step (1) of step F1, and may include one or more of a web page, an SMS, and an email. For specific content, refer to detailed description in step (1) of step F1.

Step G2: The first terminal device obtains the allowed information based on the access acknowledgment request, where the allowed information is information about allowing the first terminal device to access the network at an access location corresponding to the access location information.

After receiving the access acknowledgment request from the second network element, the first terminal device may further obtain, based on the access location information of the first terminal device included in the access acknowledgment request, the allowed information for allowing the first terminal device to access the network at the access location corresponding to the access location information.

The allowed information may include allowed information obtained based on a local configuration or a local policy of the first terminal device. Alternatively, the allowed information may include allowed information obtained based on instructions of a user or based on an operation of the user.

Step G3: The first terminal device sends the allowed information to the second network element.

It should be further noted that, before performing step G1, the first terminal device may further perform the following steps H1 to H2, to first establish a PDU session channel with the second network element, to transmit session data to each other with the second network element through the PDU session.

Step H1: The first terminal device receives, from the first network element, an identifier of the second network element and/or information indicating that the first terminal device is in an access restricted state.

Step H2: The first terminal device establishes a session with the second network element based on the identifier of the second network element and/or the information indicating that the first terminal device is in the access restricted state.

Execution processes of step H1 and step H2 are basically the same as execution processes of the foregoing steps E1 to E5. For related parts, refer to the detailed descriptions of the foregoing steps E1 to E5, and details are not described herein again.

S1103: The first terminal device accesses the network at the access location of the first terminal device based on the access success message, where the access location information corresponding to the access location does not belong to subscription location information of the first terminal device.

In embodiments of this application, after receiving the access success message, the first terminal device may access the network at the access location based on the access success message even if the access location information corresponding to the access location in which the first terminal device is located does not belong to the subscription location information of the first terminal device. For a specific implementation process, refer to the detailed description in the foregoing embodiments.

It should be further noted that, in a possible implementation of this embodiment, before step S1101, the first terminal device may further receive timer information from the first network element, and may further determine, based on the timer information, whether a timer expires. If the timer expires, step S1011 may be performed, that is, the access request is sent to the first network element. For a specific implementation process, refer to detailed descriptions about the timer in the foregoing embodiments.

In addition, in embodiments of this application, the first terminal device may further send indication information to the first network element, to indicate the first network element to obtain, within a first preset time period, the allowed information from the second network element. The allowed information is information about allowing the first terminal device to access the network at the access location corresponding to the access location information. For a specific implementation process, refer to detailed descriptions about the timer in the foregoing embodiments.

Figure 12:
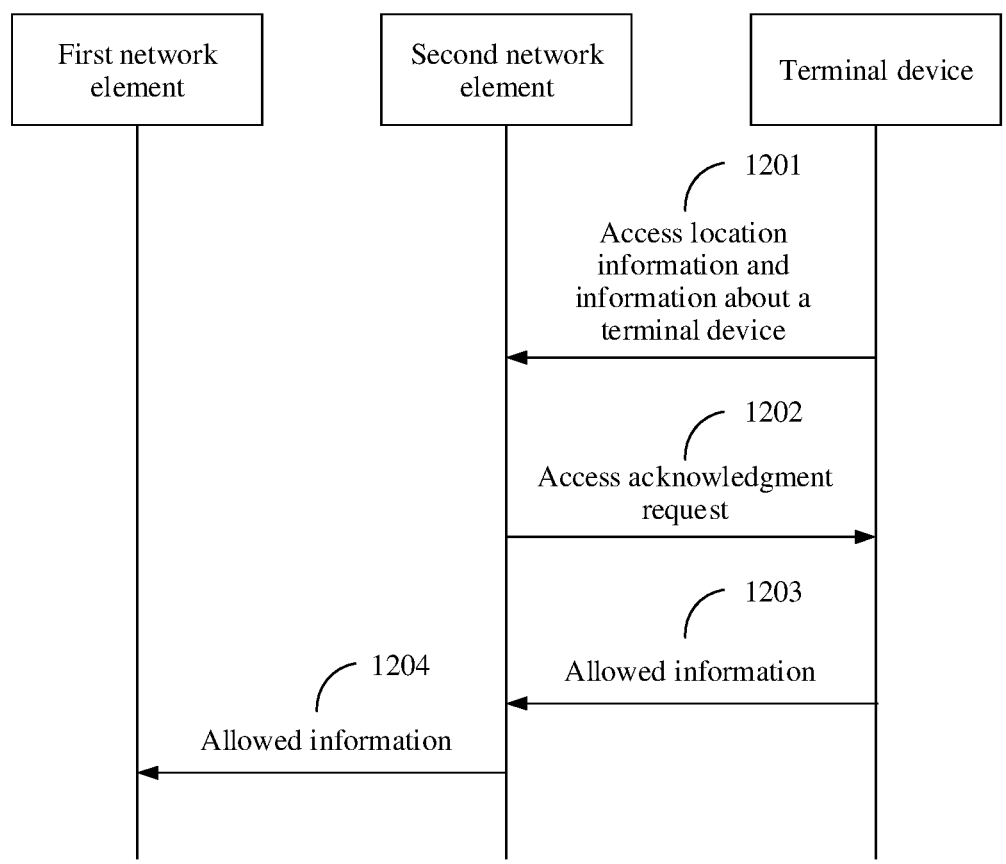
FIG. 12 is a flowchart of another network access method according to an embodiment of this application.

FIG. 12 is a flowchart of another network access method according to an embodiment of this application. The following describes the method.

S1201: A second network element obtains access location information of a first terminal device and information of a terminal device.

The access location information of the first terminal device does not belong to subscription location information of the first terminal device. The information about the terminal device is an identifier of the first terminal device or an identifier of a second terminal device. The identifier of the second terminal device is a user identifier representing identity information of the second terminal device, and may include at least one of an SUCI, an SUPI, an MSISDN, or a temporary identifier. The second terminal device refers to another terminal device except the first terminal device, and the identifier of the second terminal device may have a specific mapping relationship with the identifier of the first terminal device. Alternatively, the second terminal device may be a terminal device through which a user logs in to an account of social software (such as an email or WeChat).

S1202: The second network element sends an access acknowledgment request to the terminal device.

After obtaining the access location information of the first terminal device and the information about the terminal device, the second network element may send the access acknowledgment request including the information to the terminal device. For a specific implementation process, refer to the description of step F1, and replace the "allowed information obtaining request" with the "access acknowledgment request" in step F1.

The access acknowledgment request is used to obtain allowed information, and the allowed information is used to allow the first terminal device to access a network at an access location corresponding to the access location information. For detailed content, refer to the foregoing steps G1 to G2. Details are not described herein again.

It should be noted that, in a possible implementation of this embodiment, the information about the terminal device may include the identifier of the second terminal device. In this case, the "A second network element obtains information of a terminal device" in step S1201 may specifically include the following steps I1 to I2.

Step I1: The second network element obtains the identifier of the first terminal device.

Step I2: The second network element obtains the identifier of the second terminal device based on the identifier of the first terminal device.

In this implementation, based on the description in the foregoing embodiments, it can be learned that there is a specific mapping relationship between the identifier of the first terminal device and the identifier of the second terminal device, and the mapping relationship is stored in corresponding subscription information. Therefore, after obtaining the identifier of the first terminal device, the second network element may determine the identifier of the second terminal device based on a specific mapping relationship between the identifier and the identifier of the first terminal device.

Further, on this basis, a specific implementation process of step S1202 may include the following steps J1 to J2.

Step J1: The second network element obtains, based on the identifier of the first terminal device, an identifier of an access management network element corresponding to the second terminal device.

The access management network element may be an AMF network element or an MME network element.

Step J2: The second network element sends the access acknowledgment request to the access management network element based on the identifier of the access management network element.

Specifically, after obtaining the access location information of the first terminal device, the information about the terminal device, and the identifier of the access management network element corresponding to the second terminal device, the second network element may send, to the access management network element, the access acknowledgment request that includes the identifier of the second terminal device. Then, the access management network element forwards the access acknowledgment request to the second terminal device, to obtain the allowed information from the second terminal device. For a specific implementation process, refer to the description in (2) in step F1, and replace the "allowed information obtaining request" in (2) in step F1 with the "access acknowledgment request".

S1203: The second network element receives the allowed information from the terminal device.

It should be noted that step S1203 is consistent with the foregoing step F2. For related parts, refer to the description of step F2. Details are not described herein again.

S1204: The second network element sends the allowed information to the first network element.

The allowed information is used by the first network element to allow the first terminal device to access the network at the access location corresponding to the access location information. For a specific implementation process, refer to the detailed description in the foregoing embodiments.

Figure 13:
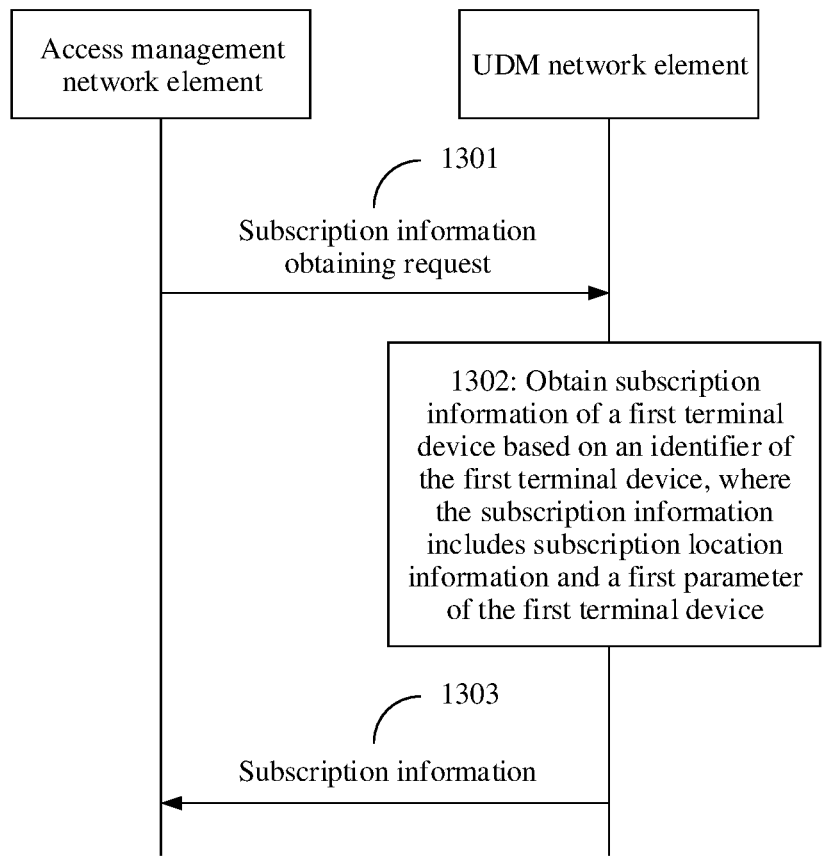
FIG. 13 is a flowchart of another network access method according to an embodiment of this application.

FIG. 13 is a flowchart of another network access method according to an embodiment of this application. The following describes the method.

S1301: A UDM network element receives a subscription information obtaining request from an access management network element.

The subscription information obtaining request includes a first identifier of a first terminal device. The access management network element may be an AMF network element or an MME network element.

S1302: The UDM network element obtains subscription information of the first terminal device based on the first identifier of the first terminal device, where the subscription information includes subscription location information and a first parameter of the first terminal device.

The first parameter indicates that when access location information of the first terminal device does not belong to the subscription location information, the first terminal device is allowed to access a network at an access location corresponding to the access location information.

Specifically, if the UDM network element obtains the subscription information that includes the subscription location information and the first parameter of the first terminal device, and the first parameter indicates that when the access location information of the first terminal device does not belong to the subscription location information, the first terminal device is allowed to access the network at the access location corresponding to the access location information. It indicates that the UDM network element does not need to obtain the allowed information from the second network element, and network access of the first terminal device can be quickly and conveniently implemented based on content of the first parameter.

In addition or alternatively, in a possible implementation of this embodiment, the subscription information may further include information of a terminal device, and the information about the terminal device includes an identifier of a second terminal device. After receiving a second identifier of the first terminal device from the second network element, the UDM network element may determine the identifier of the second terminal device based on a mapping relationship between the second identifier of the first terminal device that is stored in the subscription information and the identifier of the second terminal device. The second identifier may be the same as or different from the first identifier, and both the second identifier and the first identifier are unique identifiers of the first terminal device, for example, an SUCI or an SUPI.

Further, the UDM network element may send the identifier of the second terminal device to an NEF network element, to obtain the allowed information from the second terminal device in a form of an SMS, where the allowed information is information that allows the first terminal device to access the network at the access location corresponding to the access location information.

In addition, in a possible implementation of this embodiment, the subscription information may further include an identifier of an access management network element corresponding to the terminal device.

The access management network element may be the AMF network element or the MME network element. In this way, the UDM network element may further send an allowed information obtaining request to the access management network element corresponding to the identifier of the access management network element, to obtain the allowed information from the terminal device corresponding to the access management network element through the access management network element.

S1303: The UDM network element sends the subscription information of the first terminal device to the access management network element.

Specifically, if the subscription information includes the first parameter, the UDM network element does not need to obtain the allowed information from the terminal device by using the foregoing steps, so that network access of the first terminal device can be quickly and conveniently implemented based on the content of the first parameter. If the subscription information does not include the first parameter, the UDM network element may obtain the allowed information from the terminal device by performing the foregoing steps, to implement automatic update of the subscription information, and send the subscription information to the access management network element, so that the access management network element allows, based on the allowed information, the first terminal device to access the network at the access location corresponding to the access location information. For a specific implementation process, refer to the detailed description in the foregoing embodiments.

To better implement the foregoing solutions in embodiments of this application, the following further provides a related apparatus for implementing the foregoing solutions.

Figure 14:
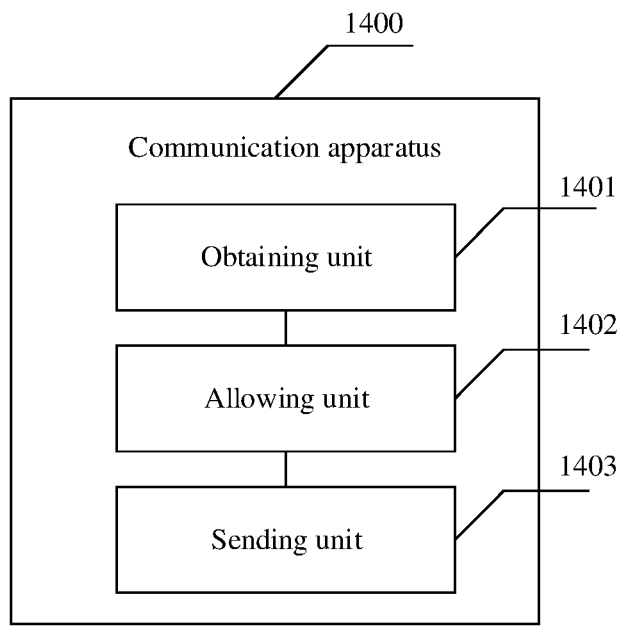
FIG. 14 is a block diagram of a structure of a communication apparatus according to an embodiment of this application.

FIG. 14 shows a communication apparatus 1400 according to an embodiment of this application, used in a first network element. For example, the apparatus 1400 may be the first network element, or may be a chip or a chip system in the first network element. The apparatus 1400 may include an obtaining unit 1401 and an allowing unit 1402. The obtaining unit 1401 is configured to perform S201, S202, and S203 in the embodiment shown in FIG. 2. The allowing unit 1402 is configured to perform S204 in the embodiment shown in FIG. 2. Details are as follows.

The obtaining unit 1401 is configured to: obtain an access request, where the access request includes access location information of a first terminal device; obtain subscription information of the first terminal device, where the subscription information includes subscription location information; and obtain allowed information when it is determined that the access location information of the first terminal device does not belong to the subscription location information, where the allowed information is information for allowing the first terminal device to access a network at an access location corresponding to the access location information.

The permission unit 1402 is configured to allow, based on the allowed information, the first terminal device to access the network at the access location corresponding to the access location information.

In an implementation of this embodiment, that the obtaining unit 1401 is configured to obtain allowed information includes: The obtaining unit 1401 is configured to obtain the allowed information from a second network element.

In an implementation of this embodiment, the apparatus further includes: a sending unit 1403, configured to send at least one of the access location information of the first terminal device and first indication information to the second network element, where the first indication information is used to indicate the second network element to obtain the allowed information.

In an implementation of this embodiment, the sending unit 1403 is further configured to send information of a terminal device to the second network element, where the information about the terminal device is used by the second network element to obtain the allowed information from the terminal device corresponding to the information about the terminal device.

In an implementation of this embodiment, the sending unit 1403 is further configured to send an identifier of an access management network element corresponding to the terminal device to the second network element, where the identifier of the access management network element is used by the second network element to obtain the allowed information from the terminal device.

In a possible implementation of this embodiment, the sending unit 1403 is further configured to send second indication information to the first terminal device, where the second indication information is used to indicate the first terminal device to establish a session used to communicate with the second network element. The session is used by the first terminal device to send at least one of the information about the terminal device, the access location information of the first terminal device, and third indication information to the second network element, where the third indication information is used to indicate the second network element to obtain the allowed information.

In an implementation of this embodiment, the session is further used by the first terminal device to send the allowed information to the second network element.

In an implementation of this embodiment, the second indication information includes an identifier of the second network element and/or information indicating that the first terminal device is in an access restricted state.

In an implementation of this embodiment, the communication apparatus is an access and mobility management function AMF network element or a unified data management UDM function network element, and the sending unit is further configured to send the information indicating that the first terminal device is in the access restricted state to a session management network element and/or a policy control function PCF network element.

In an implementation of this embodiment, that the obtaining unit is configured to obtain allowed information includes: The obtaining unit is configured to obtain a first parameter in the subscription information, where the first parameter indicates that when the access location information of the first terminal device does not belong to the subscription location information, the first terminal device is allowed to access the network at the access location corresponding to the access location information.

In an implementation of this embodiment, the communication apparatus is an access management network element. The sending unit is configured to send a subscription information update request to a unified data management UDM function network element, where the subscription information update request includes the access location information of the first terminal device, and the subscription information update request is used to indicate the unified data management UDM function network element to update the subscription location information based on the access location information of the first terminal device.

In an implementation of this embodiment, the communication apparatus is the unified data management UDM function network element. The apparatus further includes an updating unit, configured to update the subscription location information based on the access location information of the first terminal device.

In an implementation of this embodiment, that the obtaining allowed information includes: obtaining the allowed information from the second network element in a first preset time period.

In an implementation of this embodiment, when the first network element does not obtain the allowed information within the first preset time period, the sending unit is configured to send timer information to the first terminal device, where the timer information is used to indicate the first terminal device to send the access request after a timer expires.

In an implementation of this embodiment, that the allowing, based on the allowed information, the first terminal device to access the network at the access location corresponding to the access location information includes: sending an access success message to the first terminal device.

In embodiments of this application, the sending unit may implement a signal sending operation of the first network element in the foregoing method embodiments. The obtaining unit and the allowing unit may be specifically processing units. The processing unit may implement a signal processing operation of the first network element in the foregoing method embodiments. In some implementations of this application, the communication apparatus may further include a receiving unit. The obtaining unit may obtain information through the receiving unit. The receiving unit may implement a signal receiving operation of the first network element in the foregoing method embodiments.

To better implement the foregoing solutions in embodiments of this application, the following further provides a related apparatus for implementing the foregoing solutions.

Figure 15:
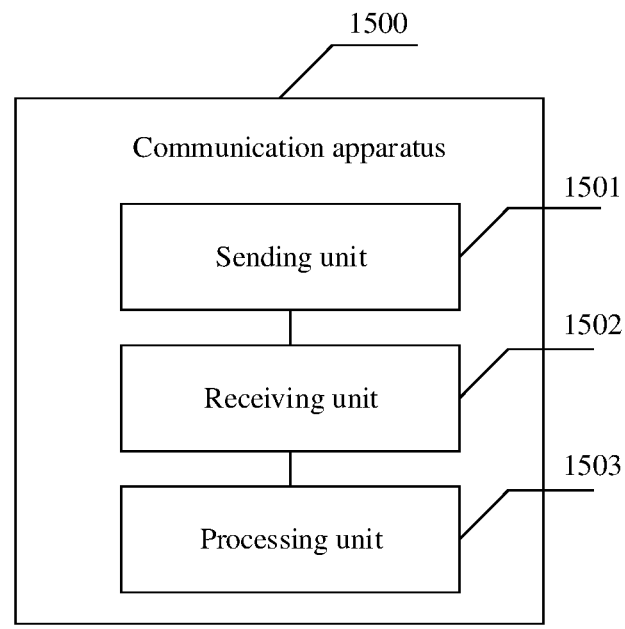
FIG. 15 is a block diagram of a structure of another communication apparatus according to an embodiment of this application.

FIG. 15 shows a communication apparatus 1500 according to an embodiment of this application, used in a first terminal device. The apparatus 1500 may include a sending unit 1501, a receiving unit 1502, and a processing unit 1503. The sending unit 1501 is configured to perform S1101 in the embodiment shown in FIG. 11. The receiving unit 1502 is configured to perform S1102 in the embodiment shown in FIG. 11. The processing unit 1503 is configured to perform S1103 in the embodiment shown in FIG. 11. Details are as follows.

The sending unit 1501 is configured to send an access request to a first network element.

The receiving unit 1502 is configured to receive an access success message sent by the first network element based on the access request.

The processing unit 1503 is configured to access a network at an access location of the first terminal device based on the access success message, where access location information corresponding to the access location does not belong to subscription location information of the first terminal device.

In an implementation of this embodiment, the receiving unit is further configured to receive an access acknowledgment request from a second network element. The processing unit is further configured to obtain allowed information based on the access acknowledgment request, where the allowed information is information that allows the first terminal device to access the network at the access location corresponding to the access location information. The sending unit is further configured to send the allowed information to the second network element.

In an implementation of this embodiment, the receiving unit is further configured to receive an identifier of the second network element and/or information indicating that the first terminal device is in an access restricted state from the first network element. A session establishment unit is further configured to establish a session with the second network element based on the identifier of the second network element and/or the information indicating that the first terminal device is in the access restricted state.

In an implementation of this embodiment, the access acknowledgment request includes one or more of the following: a web page, an SMS, and an email.

In an implementation of this embodiment, the receiving unit is further configured to receive timer information from the first network element, where the timer information is used to indicate the first terminal device to send the access request after a timer expires.

The sending unit is further configured to send the access request based on the timer information after the timer expires.

Figure 16:
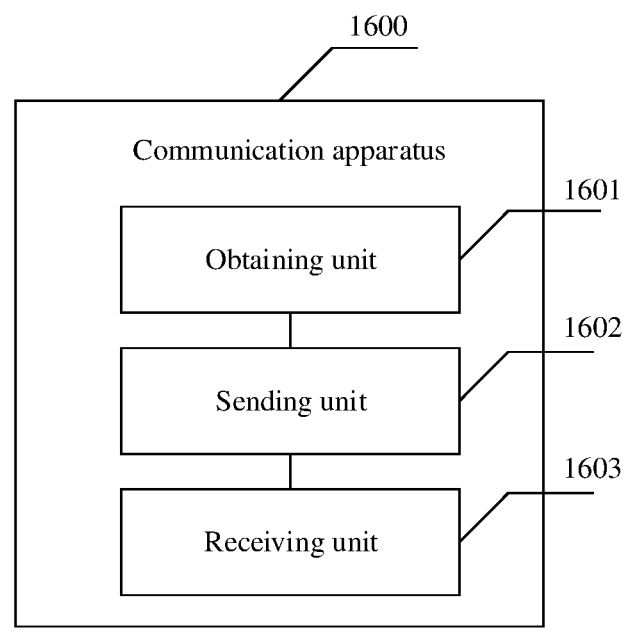
FIG. 16 is a block diagram of a structure of another communication apparatus according to an embodiment of this application.

To better implement the foregoing solutions in embodiments of this application, the following further provides a related apparatus for implementing the foregoing solutions. FIG. 16 shows a communication apparatus 1600 according to an embodiment of this application, used in a second network element. The apparatus 1600 may include an obtaining unit 1601, a sending unit 1602, and a receiving unit 1603. The obtaining unit 1601 is configured to perform S1201 in the embodiment shown in FIG. 12. The sending unit 1602 is configured to perform S1202 and S1204 in the embodiment shown in FIG. 12. The receiving unit 1603 is configured to perform S1203 in the embodiment shown in FIG. 12. Details are as follows.

The obtaining unit 1601 is configured to obtain access location information of a first terminal device and information of a terminal device, where the access location information of the first terminal device does not belong to subscription location information of the first terminal device.

The sending unit 1602 is configured to send an access acknowledgment request to the terminal device, where the access acknowledgment request is used to obtain allowed information, and the allowed information is used to allow the first terminal device to access a network at an access location corresponding to the access location information.

The receiving unit 1603 is configured to receive the allowed information from the terminal device.

The sending unit 1602 is further configured to send the allowed information to a first network element, where the allowed information is used by the first network element to allow the first terminal device to access the network at the access location corresponding to the access location information.

In an implementation of this embodiment, the information about the terminal device includes an identifier of the second terminal device. The obtaining unit 16oi is configured to obtain an identifier of the first terminal device, and obtain the identifier of the second terminal device based on the identifier of the first terminal device.

The sending unit 1602 is configured to send an access acknowledgment request to the second terminal device based on the identifier of the second terminal device.

In an implementation of this embodiment, the obtaining unit is configured to obtain, based on the identifier of the second terminal device, an identifier of an access management network element serving the second terminal device. The sending unit is configured to send the access acknowledgment request to the access management network element based on the identifier of the access management network element, where the access acknowledgment request includes the identifier of the second terminal device, and the identifier of the second terminal device is used to obtain the allowed information from the second terminal device.

In embodiments of this application, the sending unit may implement a signal sending operation of the terminal device in the foregoing method embodiment. The processing unit may implement a signal processing operation of the terminal device in the foregoing method embodiment. The receiving unit may implement a signal receiving operation of the terminal device in the foregoing method embodiment.

Figure 17:
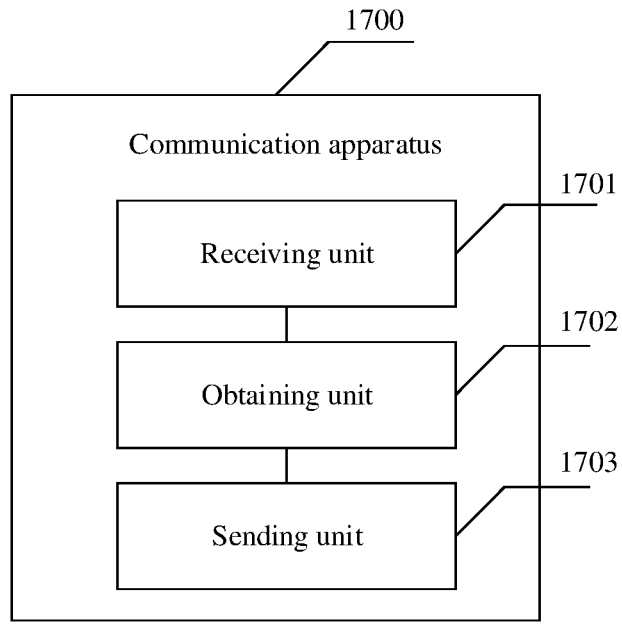
FIG. 17 is a block diagram of a structure of another communication apparatus according to an embodiment of this application.

To better implement the foregoing solutions in embodiments of this application, the following further provides a related apparatus for implementing the foregoing solutions. FIG. 17 shows a communication apparatus 1700 according to an embodiment of this application, used in a unified data management UDM function network element. The apparatus 1700 may include a receiving unit 1701, an obtaining unit 1702, and a sending unit 1703. The receiving unit 1701 is configured to perform S1301 in the embodiment shown in FIG. 13. The obtaining unit 1702 is configured to perform S1302 in the embodiment shown in FIG. 13. The sending unit 1703 is configured to perform S1303 in the embodiment shown in FIG. 13. Details are as follows:

The receiving unit 1701 is configured to receive a subscription information obtaining request from an access management network element, where the subscription information obtaining request includes a first identifier of a first terminal device.

The obtaining unit 1702 is configured to obtain subscription information of the first terminal device based on the first identifier of the first terminal device, where the subscription information includes subscription location information of the first terminal device and a first parameter, and the first parameter indicates that when access location information of the first terminal device does not belong to the subscription location information, the first terminal device is allowed to access a network at an access location corresponding to the access location information.

The sending unit 1703 is configured to send the subscription information of the first terminal device to the access management network element.

In an implementation of this embodiment, the subscription information further includes information about a terminal device.

In an implementation of this embodiment, the information about the terminal device includes an identifier of a second terminal device.

In an implementation of this embodiment, the receiving unit is further configured to receive a second identifier of the first terminal device from a second network element.

The obtaining unit is further configured to obtain the identifier of the second terminal device based on the second identifier of the first terminal device.

The sending unit is further configured to send the identifier of the second terminal device to a network capability exposure function NEF network element, where the identifier of the second terminal device is used to obtain allowed information from the second terminal device, and the allowed information is information that allows the first terminal device to access the network at the access location corresponding to the access location information.

In an implementation of this embodiment, the subscription information further includes an identifier of an access management network element serving the terminal device.

In embodiments of this application, the sending unit may implement a signal sending operation of the UDM network element in the foregoing method embodiment, and the obtaining unit may be specifically a processing unit. The processing unit may implement a signal processing operation of the UDM network element in the foregoing method embodiments. In some implementations of this application, the communication apparatus may further include a receiving unit. The obtaining unit may obtain information through the receiving unit. The receiving unit may implement a signal receiving operation of the UDM network element in the foregoing method embodiments.

Figure 18:
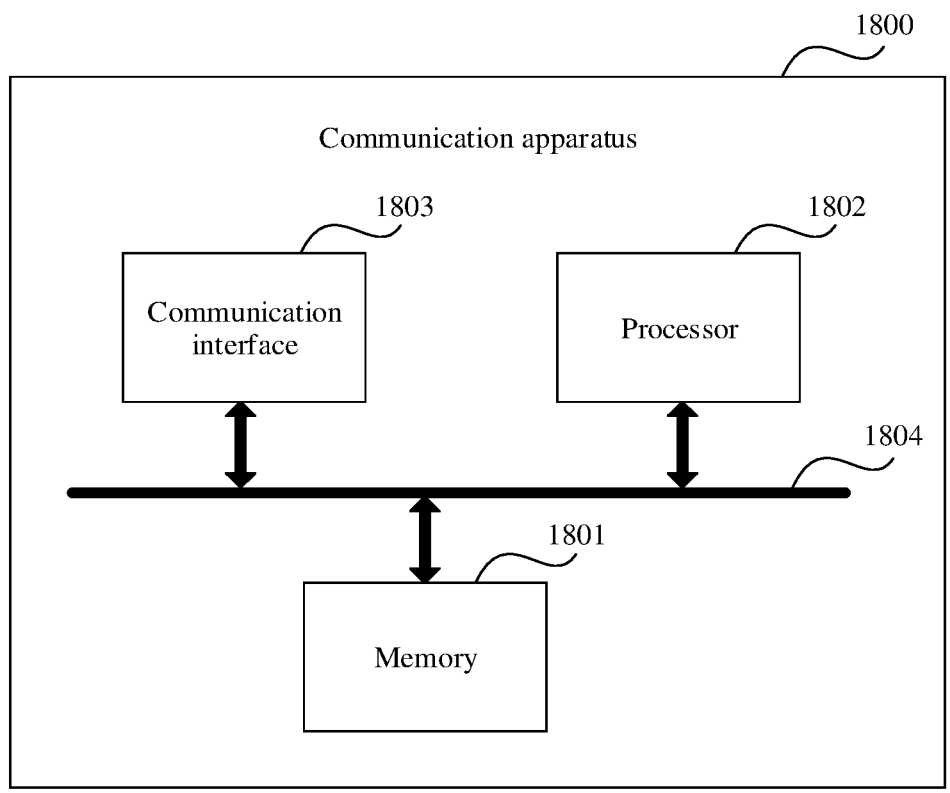
FIG. 18 is a schematic diagram of a structure of a communication apparatus according to an embodiment of this application.

FIG. 18 shows a communication apparatus 1800 according to an embodiment of this application. The apparatus includes a memory 18oi, at least one processor 1802, and a communication interface 1803.

The memory 1801 is configured to store instructions.

Figure 2:
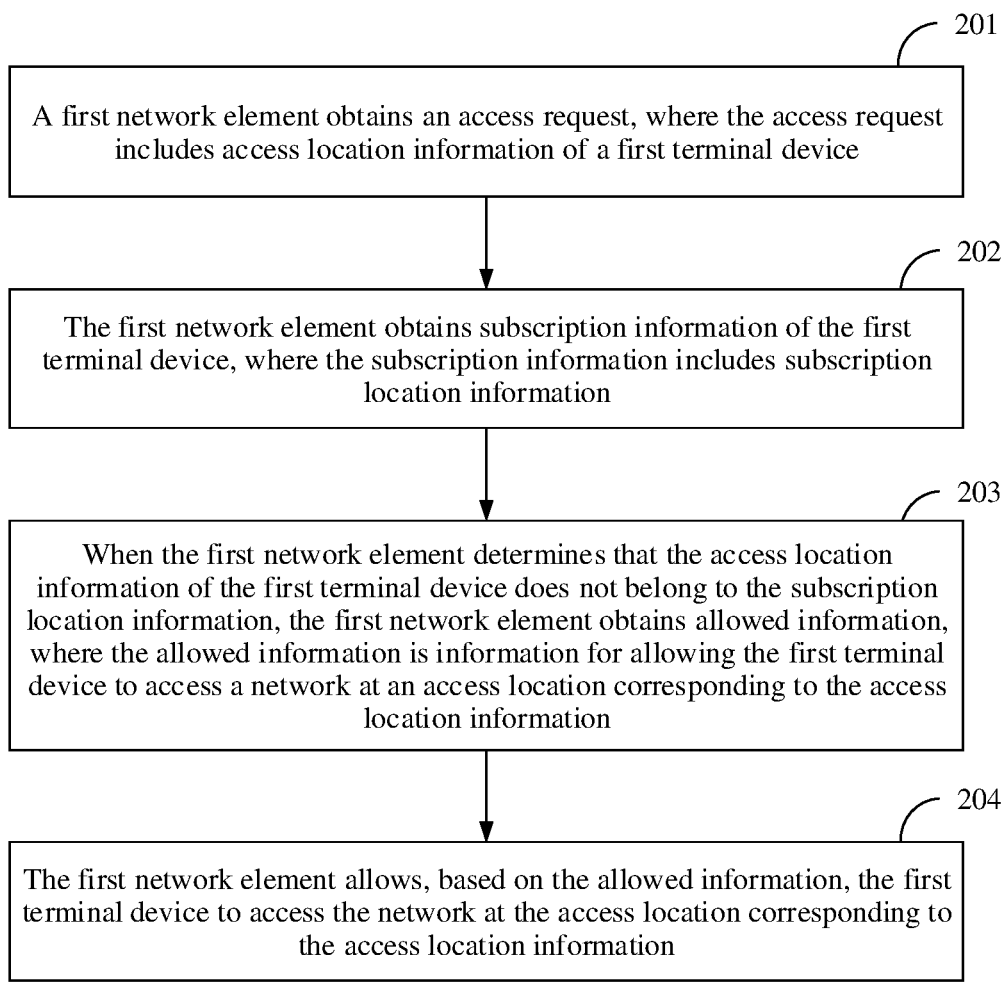
FIG. 2 is a flowchart of a network access method according to an embodiment of this application.

The processor 1802 is configured to execute the instructions in the memory 1801, to perform the foregoing network access method applied to the embodiment shown in FIG. 2.

The communication interface 1803 is configured to perform communication.

The memory 1801, the processor 1802, and the communication interface 1803 are connected to each other through a bus 1804. The bus 1804 may be a peripheral component interconnect (PCI for short) bus, an extended industry standard architecture (EISA for short) bus, or the like. Buses may be classified into an address bus, a data bus, a control bus, and the like. For ease of representation, only one thick line is used to represent the bus 1803 in FIG. 18, but this does not mean that there is only one bus or only one type of bus.

In a specific embodiment, the processor 1802 is configured to perform a function of the first network element in the foregoing method. Specifically, when network access is performed, an access request including access location information of a first terminal device is first obtained, and then subscription information including subscription location information of the first terminal device is obtained. When it is determined that the access location information of the first terminal device does not belong to the subscription location information, allowed information for allowing the first terminal device to access a network at an access location corresponding to the access location information may be obtained, and the first terminal device may further be allowed, based on the allowed information, to access the network at the access location corresponding to the access location information. For a detailed processing process of the processor 1802, refer to detailed descriptions of S201, S202, S203, S204, and S205 in the embodiment shown in FIG. 2. Details are not described herein again.

Alternatively, the processor 1802 is configured to perform a function of the first terminal device in the foregoing method, and specifically, when performing network access, send an access request to a first network element, and then receive an access success message sent by the first network element based on the access request. Further, the processor 1802 may access a network at an access location of the first terminal device based on the access success message, where access location information corresponding to the access location does not belong to subscription location information of the first terminal device. For a detailed processing process of the processor 1802, refer to detailed descriptions of S1101, S1102, and S1103 in the embodiment shown in FIG. 11. Details are not described herein again.

Alternatively, the processor 1802 is configured to perform a function of the second network element in the foregoing method, and specifically, when performing network access, obtain access location information of a first terminal device and information of a terminal device, where the access location information of the first terminal device does not belong to subscription location information of the first terminal device. Then, the processor 1802 sends an access acknowledgment request to the terminal device, where the access acknowledgment request is used to obtain allowed information, and the allowed information is used to allow the first terminal device to access a network at an access location corresponding to the access location information. Then, the processor 1802 receives allowed information from the terminal device, sends the allowed information to the first network element, where the allowed information is used by the first network element to allow the first terminal device to access the network at the access location corresponding to the access location information. For a detailed processing process of the processor 1802, refer to detailed descriptions of S1201, S1202, S1203, and S1204 in the embodiment shown in FIG. 12. Details are not described herein again.

Alternatively, the processor 1802 is configured to perform a function of the UDM network element in the foregoing method. Specifically, when network access is performed, the processor 1802 first receives a subscription information obtaining request from an access management network element, where the subscription information obtaining request includes a first identifier of a first terminal device. Then the processor 1802 obtains subscription information of the first terminal device based on the first identifier of the first terminal device, where the subscription information includes subscription location information of the first terminal device and a first parameter, and the first parameter indicates that when access location information of the first terminal device does not belong to the subscription location information, the first terminal device is allowed to access a network at an access location corresponding to the access location information. Then, the processor 1802 sends the subscription information of the first terminal device is sent to an access management network element. For a detailed processing process of the processor 1802, refer to detailed descriptions of S1301, S1302, and S1303 in the embodiment shown in FIG. 13. Details are not described herein again.

The memory 1801 may be a random access memory (RAM), a flash (memory, a read-only memory (ROM), an erasable programmable read-only memory (EPROM), an electrically erasable programmable read-only memory (EEPROM), a register, a hard disk, a removable hard disk, a CD-ROM, or any other form of storage medium known to a person skilled in the art.

The processor 1802 may be, for example, a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing module 112 may implement or execute logical blocks, modules, and circuits in various examples described with reference to content disclosed in this application. Alternatively, the processor may be a combination of processors implementing a computing function, for example, a combination of one or more microprocessors, or a combination of a DSP and a microprocessor.

The communication interface 1803 may be, for example, an interface card, or may be an Ethernet interface or an asynchronous transfer mode (ATM) interface.

Embodiments of this application further provides a computer-readable storage medium, including instructions. When the instructions are run on a computer, the computer is enabled to perform the foregoing network access method.

Embodiments of this application further provides a chip or a chip system. The chip or the chip system includes at least one processor and a communication interface, the communication interface and the at least one processor are interconnected through a line, and the at least one processor is configured to run a computer program or instructions, to perform the method performed by the first network element, the second network element, the first terminal device, or the UDM network element in the foregoing embodiments.

The communication interface in the chip may be an input/output interface, a pin, a circuit, or the like.

In a possible implementation, the chip or the chip system described above in this application further includes at least one memory, and the at least one memory stores instructions. The memory may be a storage unit inside the chip, for example, a register or a cache, or may be a storage unit (for example, a read-only memory or a random access memory) of the chip.

Embodiments of this application further provides a communication system, including at least two of the foregoing communication apparatus 1400, the communication apparatus 1500, the communication apparatus 1600, and the communication apparatus 1700.

In embodiments of this application, the receiving unit and the sending unit may be communication interfaces, or may be corresponding transceiver circuits, transceivers, or transceiver chips. The processing unit may be a processor. In a possible implementation, an operation of the processing unit may be performed by the at least one processor.

In the specification, claims, and accompanying drawings of this application, the terms "first", "second", "third", "fourth", and so on (if available) are intended to distinguish between similar objects but do not necessarily indicate a specific order or sequence. It should be understood that the data termed in such a way is interchangeable in proper circumstances so that the embodiments of the present invention described herein can be implemented in orders other than the order illustrated or described herein. In addition, terms such as "include", "have", and any variations thereof are intended to cover non-exclusive inclusions, for example, a process, method, system, product, or device that includes a series of steps or units is not necessarily limited to those clearly listed steps or units, but may include other steps or units that are not clearly listed or inherent to such a process, method, product, or device.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical module division. In an actual implementation, there may be another division manner. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or the units may be implemented in electronic, mechanical, or other similar forms.

The units described as separate parts may or may not be physically separate, and parts displayed as units may or may not be physical units, to be specific, may be located in one position, or may be distributed on a plurality of network units. Some or all of the units may be obtained depending on an actual requirement to implement the objectives of the solutions in the embodiments.

In addition, module units in the embodiments of this application may be integrated into one processing unit. Alternatively, each of the units may exist alone physically, or at least two units are integrated into one unit. The integrated unit may be implemented in a form of hardware, or may be implemented in a form of a software module unit.

When the integrated unit is implemented in a form of a software module unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The storage medium includes any medium that can store program code, such as a USB flash drive, a removable hard disk, a read-only memory (ROM, Read-Only Memory), a random access memory (RAM, Random Access Memory), a magnetic disk, or an optical disc.

A person skilled in the art should be aware that in the foregoing one or more examples, functions described in the present invention may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium. The communication medium includes any medium that facilitates transmission of a computer program from one place to another. The storage medium may be any available medium accessible to a general-purpose or dedicated computer.

In the foregoing specific implementations, the objectives, technical solutions, and beneficial effects of the present invention are further described in detail. It should be understood that the foregoing descriptions are merely specific implementations of the present invention.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A method, comprising:
    obtaining, by a first network element, an access request, wherein the access request comprises access location information of a first terminal device;
    obtaining, by the first network element, subscription information of the first terminal device, wherein the subscription information comprises subscription location information;
    obtaining, by the first network element, allowed information from a second network element in a case that the first network element determines that the access location information of the first terminal device does not belong to the subscription location information, wherein the allowed information is information indicating whether to allow the first terminal device to access a network at an access location corresponding to the access location information;
    sending, by the first network element, second indication information to the first terminal device, wherein the second indication information indicates to the first terminal device to establish a session used to communicate with the second network element, the session is used by the first terminal device to send at least one of an identifier of the first terminal device, the access location information of the first terminal device, or third indication information to the second network element, and wherein the third indication information indicates to the second network element to obtain the allowed information; and
    allowing, by the first network element based on the allowed information, the first terminal device to access the network at the access location corresponding to the access location information.

2. The method according to claim 1, wherein before obtaining, by the first network element, the allowed information from the second network element, the method further comprises:
    sending, by the first network element, at least one of the access location information of the first terminal device or first indication information to the second network element, wherein the first indication information indicates to the second network element to obtain the allowed information.

3. The method according to claim 1, further comprising:
    sending, by the first network element, the identifier of the first terminal device to the second network element, wherein the identifier of the first terminal device is used by the second network element to obtain the allowed information from the first terminal device.

4. The method according to claim 3, further comprising:
    sending, by the first network element, an identifier of an access management network element corresponding to the first terminal device to the second network element, wherein the identifier of the access management network element is used by the second network element to obtain the allowed information from the first terminal device.

5. The method according to claim 1, wherein the session is further used by the first terminal device to send the allowed information to the second network element.

6. The method according to claim 1, wherein the second indication information comprises at least one of an identifier of the second network element or information indicating that the first terminal device is in an access restricted state.

7. The method according to claim 1, wherein the first network element is an access and mobility management function (AMF) network element or a unified data management (UDM) function network element, and the method further comprises:
    sending, by the first network element, information indicating that the first terminal device is in an access restricted state to a session management network element or a policy control function (PCF) network element.

8. The method according to claim 1, wherein obtaining, by the first network element, the allowed information comprises:
    obtaining, by the first network element, a first parameter in the subscription information, wherein the first parameter indicates that when the access location information of the first terminal device does not belong to the subscription location information, the first terminal device is allowed to access the network at the access location corresponding to the access location information.

9. The method according to claim 1, wherein the first network element is an access management network element; and
    wherein the method further comprises:
        after obtaining, by the first network element, the allowed information, sending, by the access management network element, a subscription information update request to a unified data management (UDM) function network element, wherein the subscription information update request comprises the access location information of the first terminal device, and the subscription information update request requests the UDM function network element to update the subscription location information based on the access location information of the first terminal device.

10. The method according to claim 1, wherein the first network element is a unified data management (UDM) function network element; and
    wherein the method further comprises:
        after obtaining, by the first network element, the allowed information, updating, by the UDM function network element, the subscription location information based on the access location information of the first terminal device.

11. A communication apparatus, wherein the apparatus comprises:
- at least one processor; and
- at least one memory storing computer instructions, which when executed by the at least one processor, cause the communication apparatus to:
  - obtain an access request, wherein the access request comprises access location information of a first terminal device;
  - obtain subscription information of the first terminal device, wherein the subscription information comprises subscription location information;
  - obtain allowed information from a second network element in a case that the apparatus determines that the access location information of the first terminal device does not belong to the subscription location information, wherein the allowed information is information indicating whether to allow the first terminal device to access a network at an access location corresponding to the access location information;
  - send second indication information to the first terminal device, wherein the second indication information indicates to the first terminal device to establish a session used to communicate with the second network element, the session is used by the first terminal device to send at least one of an identifier of the first terminal device, the access location information of the first terminal device, or third indication information to the second network element, and wherein the third indication information indicates to the second network element to obtain the allowed information; and
  - allow, based on the allowed information, the first terminal device to access the network at the access location corresponding to the access location information.

12. The communication apparatus according to claim 11, wherein the computer instructions, when executed by the at least one processor, further cause the communication apparatus to:
- send at least one of the access location information of the first terminal device or first indication information to the second network element before obtaining the allowed information, wherein the first indication information indicates to the second network element to obtain the allowed information.

13. The communication apparatus according to claim 11, wherein the computer instructions, when executed by the at least one processor, further cause the communication apparatus to:
- send the identifier of the first terminal device to the second network element, wherein the identifier of the first terminal device is used by the second network element to obtain the allowed information from the first terminal device.

14. The communication apparatus according to claim 13, wherein the computer instructions, when executed by the at least one processor, further cause the communication apparatus to:
- send an identifier of an access management network element corresponding to the first terminal device to the second network element, wherein the identifier of the access management network element is used by the second network element to obtain the allowed information from the first terminal device.

15. The communication apparatus according to claim 11, wherein the second indication information comprises at least one of an identifier of the second network element or information indicating that the first terminal device is in an access restricted state.

16. A non-transitory computer-readable storage medium, storing computer instructions, wherein when executed by at least one processor, cause an apparatus comprising the at least one processor to:
- obtain an access request, wherein the access request comprises access location information of a first terminal device;
- obtain subscription information of the first terminal device, wherein the subscription information comprises subscription location information;
- obtain allowed information from a second network element in a case that the apparatus determines that the access location information of the first terminal device does not belong to the subscription location information, wherein the allowed information is information indicating whether to allow the first terminal device to access a network at an access location corresponding to the access location information;
- send second indication information to the first terminal device, wherein the second indication information indicates to the first terminal device to establish a session used to communicate with the second network element, the session is used by the first terminal device to send at least one of an identifier of the first terminal device, the access location information of the first terminal device, or third indication information to the second network element, and wherein the third indication information indicates to the second network element to obtain the allowed information; and
- allow, based on the allowed information, the first terminal device to access the network at the access location corresponding to the access location information.

17. The non-transitory computer-readable storage medium according to claim 16, wherein the computer instructions, when executed by the at least one processor, further cause the apparatus to:
- send at least one of the access location information of the first terminal device or first indication information to the second network element before obtaining the allowed information, wherein the first indication information indicates to the second network element to obtain the allowed information.

18. The non-transitory computer-readable storage medium according to claim 16, wherein the computer instructions, when executed by the at least one processor, further cause the apparatus to:
- send the identifier of the first terminal device to the second network element, wherein the identifier of the first terminal device is used by the second network element to obtain the allowed information from the first terminal device.

19. The non-transitory computer-readable storage medium according to claim 18, wherein the computer instructions, when executed by the at least one processor, further cause the apparatus to:
- send an identifier of an access management network element corresponding to the first terminal device to the second network element, wherein the identifier of the access management network element is used by the second network element to obtain the allowed information from the first terminal device.

20. The non-transitory computer-readable storage medium according to claim 16, wherein the second indication information comprises at least one of an identifier of the second network element or information indicating that the first terminal device is in an access restricted state.

\* \* \* \* \*